United States Patent [19]
Kleinhen

[11] Patent Number: 5,263,701
[45] Date of Patent: Nov. 23, 1993

[54] COLLAPSABLE CONTAINER FOR STACKS OF SHEET MATERIAL

[75] Inventor: Stephen R. Kleinhen, Eaton, Ohio

[73] Assignee: AM International Incorporated, Chicago, Ill.

[21] Appl. No.: 850,430

[22] Filed: Mar. 12, 1992

Related U.S. Application Data

[63] Continuation-in-part of Ser. No. 720,887, Jun. 25, 1991, Pat. No. 5,171,125, which is a continuation-in-part of Ser. No. 566,616, Aug. 13, 1990, Pat. No. 5,069,598, which is a continuation-in-part of Ser. No. 261,394, Oct. 24, 1988, abandoned.

[51] Int. Cl.⁵ .............................................. B65H 1/00
[52] U.S. Cl. ........................................ 271/145; 271/9; 271/162; 271/207; 271/213; 220/4.28; 220/4.33; 280/47.16; 280/79.3
[58] Field of Search ..................... 220/1.5, 4.28, 4.33; 271/9, 145, 162, 164, 207, 213, 214, 215, 299, 279; 280/35, 47.16, 79.2, 79.3

[56] References Cited

U.S. PATENT DOCUMENTS

| | | | |
|---|---|---|---|
| 1,817,307 | 8/1931 | Haase et al. | 220/4.28 |
| 3,327,882 | 6/1967 | Andrews | 220/4.28 |
| 3,540,614 | 11/1970 | Flagg | 220/4.33 X |
| 4,302,025 | 11/1981 | Waddell et al. | 280/79.3 X |
| 4,346,906 | 8/1982 | Thorpe | 280/79.3 X |
| 4,462,735 | 7/1984 | Bain et al. | |
| 4,809,851 | 3/1989 | Oestreich, Jr. et al. | 220/4.33 X |
| 4,977,827 | 12/1990 | Chandhoke et al. | |
| 5,031,776 | 7/1991 | Morgan | 220/4.28 X |
| 5,069,598 | 12/1991 | Kleinhen et al. | 271/207 |

FOREIGN PATENT DOCUMENTS

| | | | |
|---|---|---|---|
| 180067 | 7/1962 | Sweden | 220/4.28 |
| 1018243 | 1/1966 | United Kingdom | 220/4.28 |
| 2242893 | 10/1991 | United Kingdom | 280/79.3 |

*Primary Examiner*—Robert P. Olszewski
*Assistant Examiner*—Boris Milef
*Attorney, Agent, or Firm*—Tarolli, Sundheim & Covell

[57] ABSTRACT

An improved container includes a base and wall panels which cooperate with the base to form compartments for holding the stacks of sheet material. The wall panels are held against movement relative to each other and the base by slidably interlocking surfaces on the base and wall panels and a single strap which extends around the base and wall panels. The strap extends through passages formed in upper end portions of the wall panels. In addition, the strap extends through a passage formed in the base. Two end wall panels and a center wall panel are formed with bottom flanges which are engaged by the stacks of sheet material. The base is formed with lift element receiving channels. A plurality of wheels are provided on the base to support the container.

61 Claims, 7 Drawing Sheets

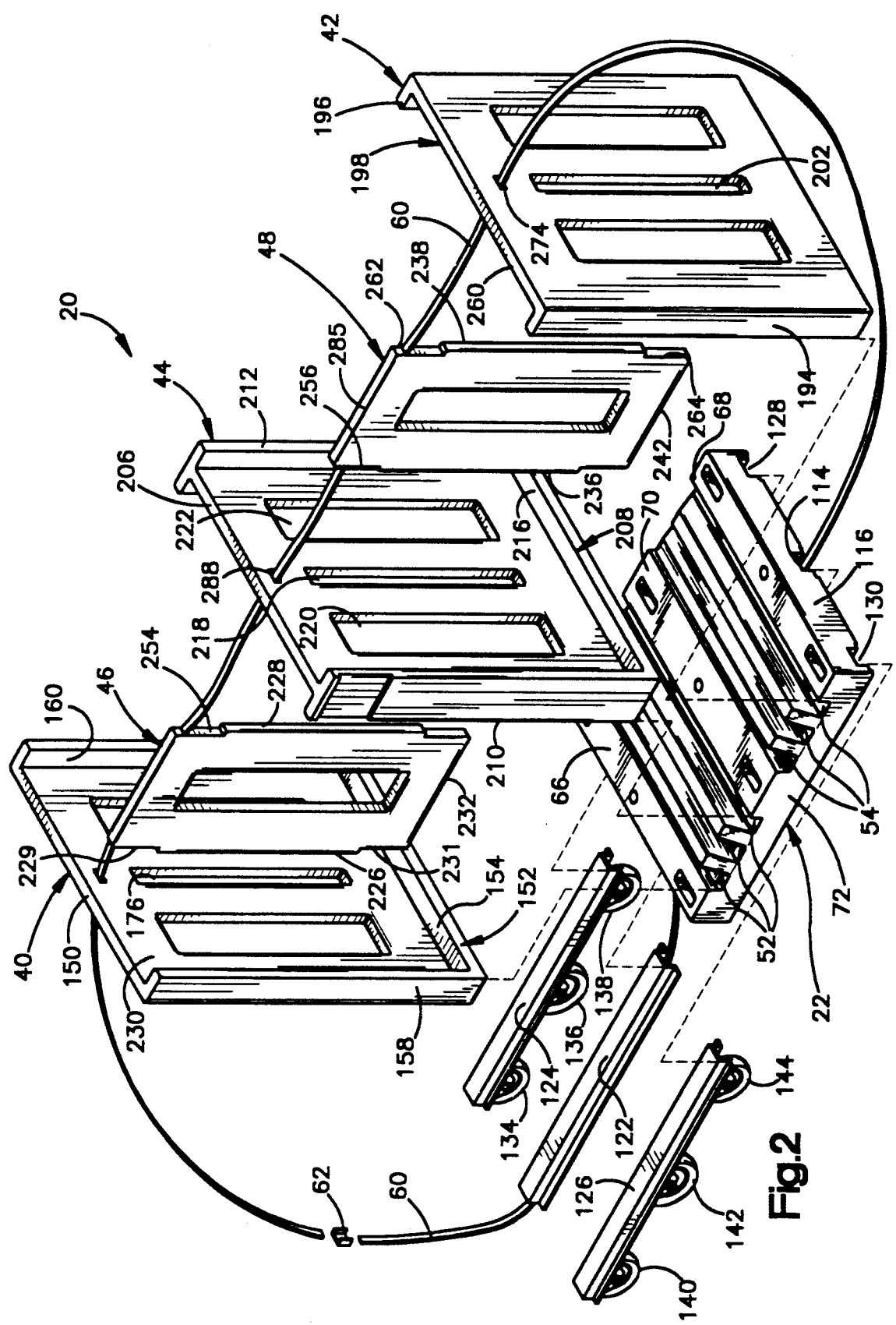

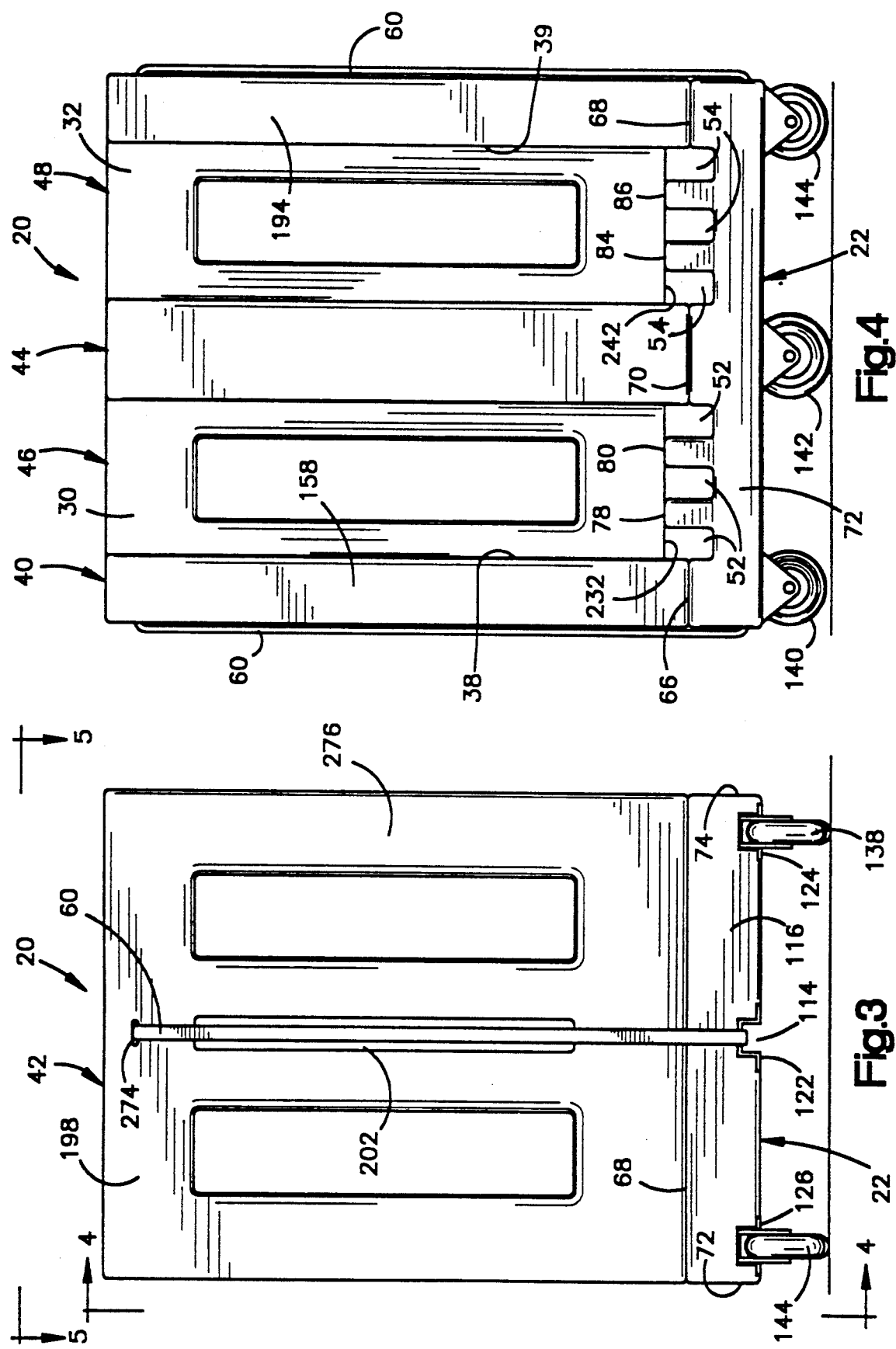

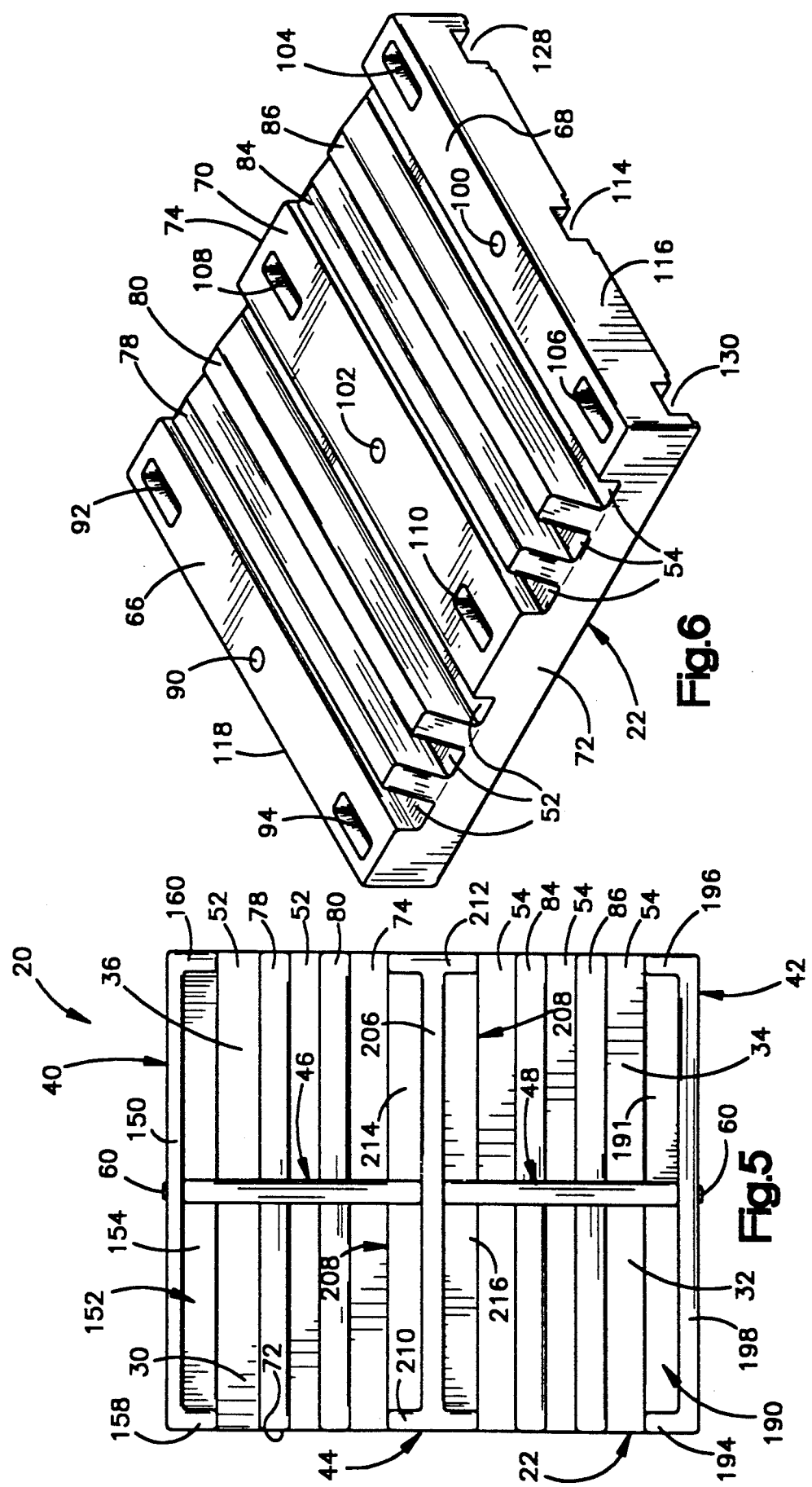

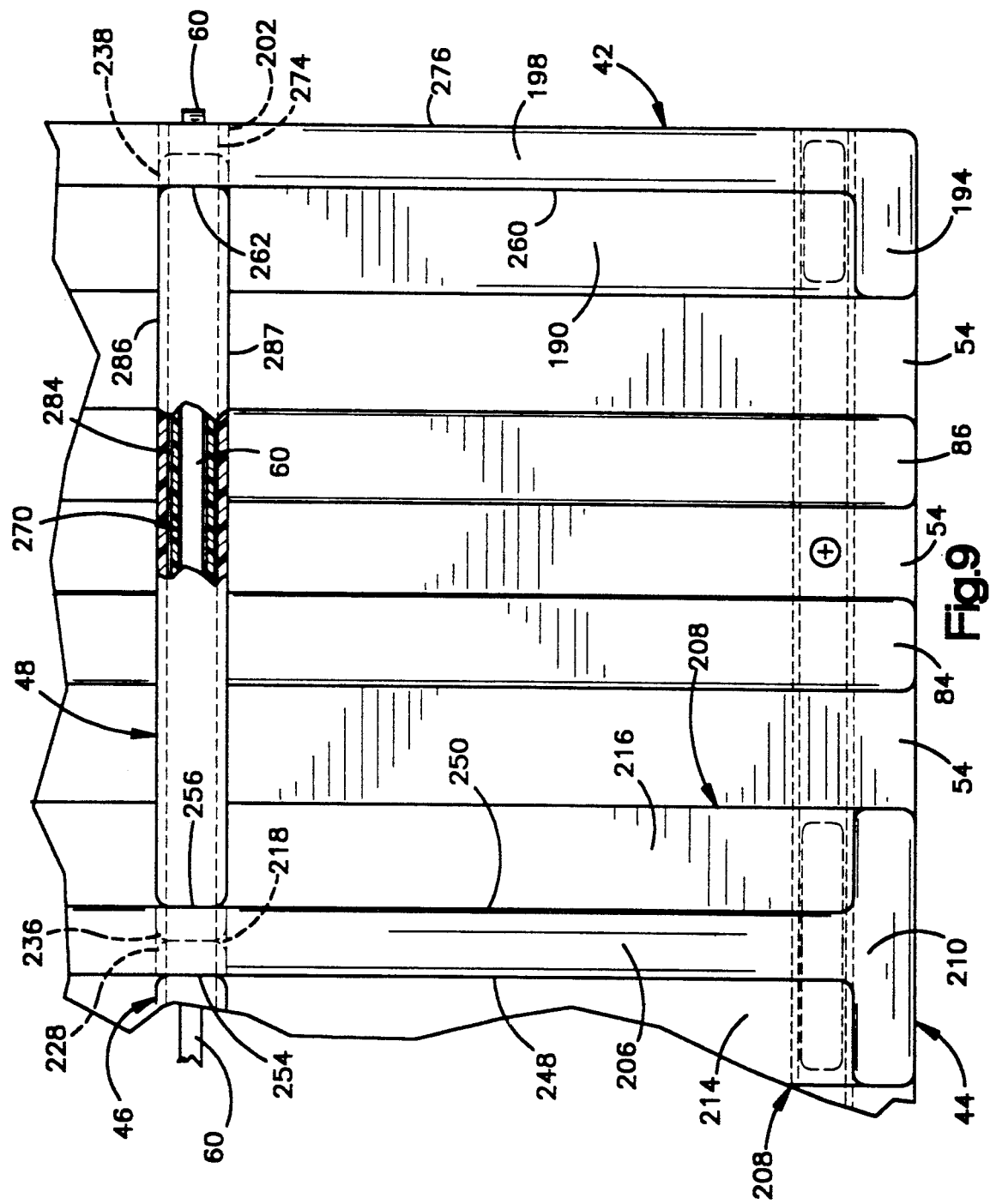

COLLAPSABLE CONTAINER FOR STACKS OF SHEET MATERIAL

RELATED APPLICATIONS

This application is a continuation-in-part of U.S. patent application Ser. No. 720,887, filed Jun. 25, 1991 by Stephen R. Kleinhen and entitled "Sheet Material Handling Apparatus and Method" now U.S. Pat. No. 5,171,125. The aforementioned U.S. patent application Ser. No. 720,887 is itself a continuation-in-part of U.S. application Ser. No. 566,616 filed Aug. 13, 1990 by Stephen R. Kleinhen and Robert A. Bryson and entitled "Apparatus and Method for Loading Sheet Material Articles" (now U.S. Pat. No. 5,069,598). The aforementioned U.S. patent application Ser. No. 566,616 is itself a continuation-in-part of application Ser. No. 261,394 filed Oct. 24, 1988 by Robert A. Bryson and entitled "Signature Handling Apparatus" (now abandoned). The benefit of the earlier filing dates of the aforementioned applications and patent has been and hereby is claimed.

BACKGROUND OF THE INVENTION

The present invention relates to an improved container to hold a plurality of stacks of sheet material.

During operation of a printing press, it is frequently advantageous to provide buffer storage for sections of a newspaper or magazine. When needed, the sections of a newspaper or magazine are moved out of storage and collated with other sections of the newspaper or magazine. Apparatus for use in storing newspaper sections is disclosed in U.S. Pat. Nos. 4,462,735 and 4,977,827.

An apparatus for sequentially loading sheet material articles into a plurality of compartments in each of a plurality of containers is disclosed in U.S. Pat. No. 5,069,598. To load an empty container, the empty container is transferred from an infeed shuttle assembly to a carriage assembly. Compartments in the empty container are sequentially filled with sheet material articles while the container is supported by the carriage assembly. In order to position the empty compartments of the container at a loading station, the carriage assembly is operable to move the empty container along a linear path and to rotate the container about a vertical axis.

Once the various compartments in the container have been loaded with stacks of sheet material articles, the container is transferred from the carriage assembly to an outfeed shuttle assembly. The container, with a plurality of stacks of sheet material articles, is then moved to a storage location.

An apparatus for unloading stacks of sheet material articles from a container is disclosed in U.S. patent application Ser. No. 720,887, filed Jun. 25, 1991 by Stephen R. Kleinhen and entitled "Sheet Material Handling Apparatus and Method". The unloader apparatus includes a shuttle assembly which is operable to move a container having a plurality of compartments containing stacks of sheet material onto a carriage assembly adjacent to an unloader assembly. After the unloader assembly has removed the stacks of sheet material from the container, the container is moved away from the carriage assembly by a second shuttle assembly. During the unloading process, the carriage assembly is operated to move the container toward and away from the unloader assembly and to rotate the container about a vertical axis.

The unloader assembly includes a lift assembly which engages the lower end of a stack of sheet material in a compartment of the container and lifts the stack of sheet material upwardly through an open lower end portion of an upright hopper. When the stack of sheet material has been moved into the hopper by the lift assembly, the hopper and the stack of sheet material are moved to a tilted orientation. As this occurs, a lower end portion of the stack of sheet material is moved upwardly along an inclined ramp into engagement with a sheet material feed assembly. The sheet material feed assembly is then operated to sequentially feed sheet material from the tilted stack.

SUMMARY OF THE INVENTION

The present invention provides a new and improved container which may advantageously be used with the previously described sheet material loader and/or unloader apparatus. However, the container may also be used with other loader and/or unloader apparatus. The container includes a plurality of wall panels which are disposed on a base and cooperate with the base to define a plurality of compartments to receive stacks of sheet material.

The wall panels and base are advantageously held against movement relative to each other by only a plurality of interlocking connector surfaces on the base and wall panels and a single strap which extends around the base and wall panels. This enables the container to be easily disassembled by merely loosening the strap and moving the interlocking connector surfaces on the wall panels and base out of engagement.

The wall panels and base are preferably formed with passages through which the strap extends. Thus, the container includes a pair of end wall panels and a center wall panel which extend upwardly from the base. A pair of divider wall panels extend between the end wall panels and the center wall panel. The strap passage may extend between opposite major side surfaces of the end and center wall panels. The strap passage may extend through the divider wall panels between opposite minor side surfaces of the divider wall panels. In the base, the strap passage may be formed by a downwardly opening channel.

The base is preferably formed with upwardly opening lift element receiving channels to enable lift elements to be inserted and removed from beneath stacks of sheet material in compartments of the container. The lower ends of the stacks of sheet material may engage support surfaces disposed between the lift element channels. In addition, the lower ends of the stacks of sheet material may engage upwardly facing surfaces on bottom flanges formed on the end wall panels and center wall panel. Wheels, which rotate about axes extending parallel to longitudinal central axes of the lift element channels, are advantageously provided on the base to facilitate moving the container.

BRIEF DESCRIPTION OF THE DRAWINGS

The foregoing and other features of the invention will become more apparent upon a consideration of the following description taken in connection with the accompanying drawings, wherein:

FIG. 2 is an exploded illustration of various components of the container of FIG. 1;

FIG. 3 is an end view of the container of FIG. 1 and illustrating the relationship between a base, end wall panel and strap;

FIG. 4 is a side view, taken generally along the line 4—4 of FIG. 3, illustrating the manner in which a pair of end wall panels and a center wall panel cooperate with the base and a pair of divider wall panels to form compartments to receive stacks of sheet material;

FIG. 5 is a top plan view, taken generally along the line 5—5 of FIG. 3 and further illustrating the manner in which the base, end wall panels, center wall panel, and divider wall panels cooperate to form a plurality of compartments to receive stacks of sheet material;

FIG. 6 is a pictorial illustration of the base of the container of FIG. 1;

FIG. 9 is a fragmentary top plan view, generally similar to FIG. 5, on an enlarged scale and illustrating the manner in which a strap passage extends through an end wall panel, center wall panel, and divider wall panel of the container of FIG. 1;

DESCRIPTION OF ONE SPECIFIC PREFERRED EMBODIMENT OF THE INVENTION

General Description

Figure 1:
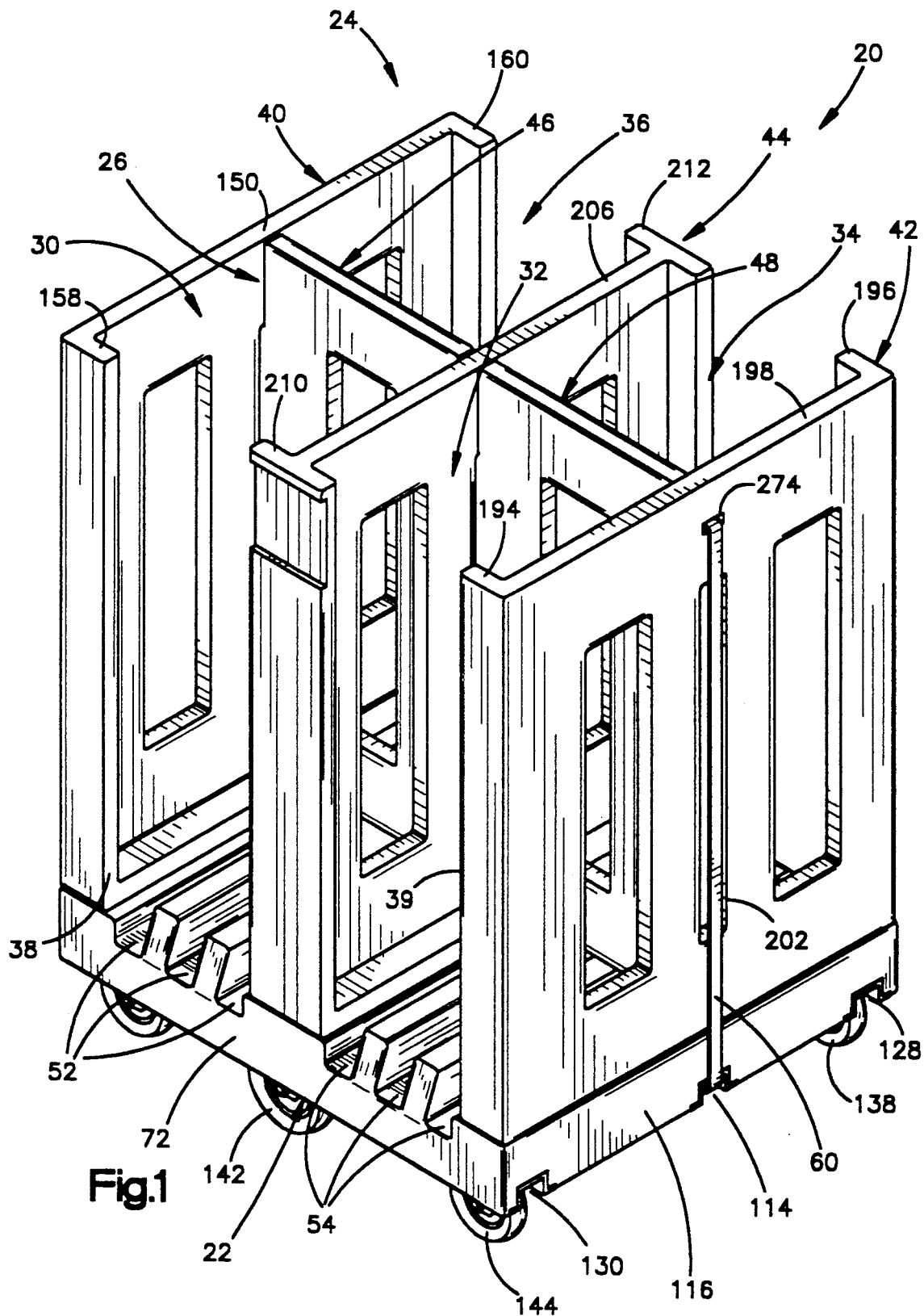
FIG. 1 is a pictorial illustration of a container constructed in accordance with the present invention.

A container 20 for holding a plurality of stacks of sheet material is illustrated in FIG. 1. The container 20 includes a rectangular base 22. Main wall panels 24 and secondary wall panels 26 cooperate with the base 22 to form a plurality of rectangular compartments 30, 32, 34 and 36 for holding stacks of sheet material, such as newspapers or signatures. The main wall panels 24 include a pair of end wall panels 40 and 42 and a center wall panel 44. The secondary wall panels 26 include a pair of divider wall panels 46 and 48 which extend between the center wall panel 44 and the end wall panels 40 and 42.

The base 22 has a first series of upwardly opening lift element channels or passages 52 which extend through the compartments 30 and 36. The base 22 also has a second series of upwardly opening lift element channels or passages 54 which extend through the compartments 32 and 34. The lift element channels 54 extend parallel to the lift element channels 52.

Each of the compartments 30-36 (FIG. 1) is provided with a rectangular opening at the upper end of the compartment and a rectangular side opening which extends down the side of the compartment. Thus, the compartment 30 has a side opening 38 which extends vertically downwardly from an open upper end of the compartment. The compartment 32 has a side opening 39 which extends vertically downwardly from the open upper end of the compartment. The compartments 34 and 36 also have side openings which extend vertically downwardly from the open upper ends of the compartments. The side openings for the compartments 34 and 36 are located on the opposite side of the container 20 from the side openings 38 and 39 for the compartments 30 and 32.

When a stack of sheet material is to be lowered into the compartment 30, a lift fork or stack support element extends through the side opening 38 into the compartment. The lift fork moves downwardly along the side opening 38 into the lift element channels 52 as the stack is lowered into the compartment 30. Once the stack has been lowered into the compartment 30, the lift fork is withdrawn from open ends of the channels 52.

When a stack is to be removed from the compartment 30, the lift fork is inserted into the channels 52. The lift fork is then moved upwardly, along the side opening 38, to raise the stack out of the compartment 30 through the open upper end of the compartment. The manner in which a stack of sheet material can be lowered into and/or removed from the compartment 30 is the same as is disclosed in U.S. patent application Ser. No. 720,887, filed Jun. 25, 1991 by Stephen R. Kleinhen and entitled "Sheet Material Handling Apparatus" and U.S. patent application Ser. No. 566,616, filed Aug. 13, 1990 by Stephen R. Kleinhen and Robert A. Bryson and entitled "Apparatus and Method for Loading Sheet Material Articles" (now U.S. Pat. No. 5,069,598). Stacks of sheet material are lowered into and removed from the compartments 32, 34 and 36 in the same manner as previously described for compartment 30.

In accordance with a feature of the present invention, the container 20 is readily disassembled for storage and then reassembled for use. To facilitate assembly and disassembly of the container 20, the base 22, main wall panels 24 and secondary wall panels 26 are interconnected by only interlocking connector surfaces on the base and wall panels and a single strap 60 (FIG. 1) which extends around the base and wall panels. The container 20 can be disassembled by merely loosening the strap 60 and moving the interlocking connector surfaces on the base 22, main wall panels 24 and secondary wall panels 26 out of engagement.

Once the container 20 has been disassembled, the various components of the container can be stored either together or separately. Thus, the identical end wall panels 40 and 42 could be stored together at one location with end wall panels for other containers. The center wall panel 44 could be stored at another location with center wall panels for other containers. The identical divider wall panels 46 and 48 could be stored together at still another location with divider wall panels for other containers. Finally, the base 22 may be stored at still another location with bases for other containers. Of course, if desired, the main wall panels 24, and secondary wall panels 26 for one container could be stored with the base 22 for that container.

The strap 60 is advantageously formed by metal strapping which is commonly used at sheet material handling facilities to form bundles of material. A tubular connector sleeve 62 (FIG. 2) is crimped, in a known manner, onto overlapping portions of the metal strap to form a continuous loop which holds the main wall panels 24 and secondary wall panels 26 against movement relative to the base 22. When the container 20 is to be disassembled, the strap 60 is severed and removed from the base 22, main wall panels 24 and secondary wall panels 26. When the container is to be reassembled, a new strap 60 is provided. Of course, a reusable strap having a different construction from the metal strap 60 could be utilized if desired. For example, a fabric strap having a buckle could be used.

Base

The base 22 (FIGS. 2, 3, 4, 5 and 6) is hollow and is formed of one piece of rotationally molded polymeric material. The rectangular base 22 includes first and second end wall support surfaces 66 and 68 (FIGS. 2, 4 and 6) which are disposed at opposite ends of the base 22. The flat end wall support surfaces 66 and 68 have an elongated rectangular configuration with longitudinal central axes which extend parallel to each other and to the central axes of the lift element channels 52 and 54. The flat end wall support surfaces 66 and 68 are disposed in the same horizontal plane.

The base 22 also includes a center wall support surface 70 (FIGS. 2, 4, and 6) which is disposed midway between the end wall support surfaces 66 and 68. The flat center wall support surface 70 has an elongated rectangular configuration with a longitudinal central axis which extends parallel to the longitudinal central axes of the end wall support surfaces 66 and 68. The flat center wall support surface 70 is disposed in the same horizontal plane as the flat end wall support surfaces 66 and 68.

The parallel lift element channels or passages 52 are disposed between the end wall support surface 66 and the center wall support surface 70. The upwardly opening lift element channels 52 have longitudinal central axes which extend parallel to the longitudinal central axes of the end wall support surface 66 and the center wall support surface 70. The lift element channels 52 have a generally rectangular cross sectional configuration, as viewed in a vertical plane which extends perpendicular to the horizontal central axes of the lift element channels. The lift element channels 52 have open ends at opposite sides 72 and 74 (FIGS. 5 and 6) of the base 22. This enables a lift fork or other lift element to be inserted into the lift element channels 52 from either the side 72 or the side 74 of the base 22.

Although it is preferred to form the lift channels 52 so that they extend completely across the base 22, each of the lift element channels could be divided in two segments by a wall or partition at a central portion of each lift element channel if desired. This is because the lift fork stops short of a central portion of the lift element channels. When the lift fork is to remove a stack of sheet material from the compartment 30 (FIGS. 1 and 5), the lift fork is inserted from the side 72 of the base 22. However, when the lift fork is to be used to lift a stack of sheet material from the compartment 36, the lift fork inserted from the opposite side 74 (FIGS. 5 and 6) of the base 22. In order to prevent interference between the lift fork and the divider wall panel 46 (FIG. 1), the lift fork does not extend under the divider wall panel 46. Thus, the lift fork has a length which is less than one-half of the length of the lift element channels 52 (FIG. 6).

A pair of flat rectangular stack support surfaces 78 and 80 (FIG. 6) are formed between the lift element channels 52. The elongated stack support surfaces 78 and 80 have a width and length which is approximately the same as the width and length of the lift element channels 52. Longitudinal central axes of the stack support surfaces 78 and 80 extend parallel to the longitudinal central axes of the lift element channels 52. The flat stack support surfaces 78 and 80 are disposed in a horizontal support plane which extends parallel to and is disposed above the plane containing the end wall support surfaces 66 and 68 and the center wall support surface 70 (FIG. 4).

The lift element channels 54 (FIGS. 4, 5 and 6) have the same construction as and extend parallel to the lift element channels 52. A pair of rectangular stack support surfaces 84 and 86 are formed between the lift element channels 54. The elongated stack support surfaces 84 and 86 have a width and length which is approximately the same as the width and length of the stack support surfaces 78 and 80. The longitudinal central axes of the stack support surfaces 84 and 86 extend parallel to the longitudinal central axes of the lift element channels 52 and 54. The flat stack support surfaces 84 and 86 are disposed in the same horizontal support plane which contains the stack support surfaces 78 and 80 and is disposed above the plan containing the end wall support surfaces 66 and 68 and the center wall support surface 70.

A plurality of upwardly opening connector recesses are formed in the base 22 to provide for interlocking engagement of the base 22 with the end wall panels 40 and 42 and center wall panel 44. Thus, the base 22 has a circular connector recess 90 (FIG. 6) which is formed as the frustum of a cone and tapers downwardly from the flat end wall support surface 66. A correspondingly shaped connector projection on the bottom of the end wall panel 40 engages the recess 90. A pair of rectangular connector recesses 92 and 94 are formed at opposite end portions of the end wall support surface 66. The recesses 92 and 94 are engaged by correspondingly shaped connector projections at the bottom of the end wall panel 40.

The end wall support surface 68 and the center wall support surface 70 are provided with connector recesses having configurations similar to the configurations of the connector recesses 90, 92 and 94. Thus, a circular connector recess 100 (FIG. 6) extends downwardly from the center of the end wall support surface 68 and a circular connector recess 102 extends downwardly from a center wall support surface 70. A pair of rectangular connector recesses 104 and 106 extend downwardly from opposite ends of the end wall support surface 68. A pair of rectangular connector recesses 108 and 110 extend downwardly from the center wall support surface 70. The recesses 100, 104 and 106 which extend downwardly from the end wall support surface 68, are engaged by corresponding connector projections on the bottom of the end wall panel 42. Similarly, the recesses 102, 108 and 110 which extend downwardly from the center wall support surface 70 are engaged by corresponding connector projections on the bottom of the center wall panel 44.

A downwardly opening strap channel or passage 114 (FIG. 6) extends between opposite ends 116 and 118 of the base 22. The downwardly opening strap channel 114 has a horizontal longitudinal central axis which extends perpendicular to the horizontal longitudinal central axes of the lift element channels 52 and 54. The downwardly opening strap channel 114 is disposed midway between and extends parallel to the opposite sides 72 and 74 of the base 22 and has a central axis which extends through the vertical central axis of the base. A reinforcing channel member 122 (FIGS. 2 and 3) having a generally U-shaped cross sectional configuration, is received in the strap channel 114 to strengthen the base 22 and to protect the base as the strap 60 is tightened.

A pair of downwardly opening wheel support channel members 124 and 126 are received in channels 128 and 130 (FIGS. 2 and 6) which are formed in the base 22 adjacent to the sides 72 and 74. The downwardly opening channels 128 and 130 extend parallel to the strap channel 114. A plurality of wheels 134, 136, 138, 140, 142, and 144 (FIG. 2) are rotatably mounted on the channel members 124 and 126. The wheels 134-144 are rotatable about horizontal axes which extend parallel to the longitudinal central axes of the lift element channels 52 and 54. Since the wheels 134-144 rotate about axes which extend parallel to the lift element channels 52 and 54, the container 20 can be readily moved along a path extending perpendicular to longitudinal central axis of the lift fork to enable the channels 52 and 54 to be accurately positioned relative to the lift fork.

The wheels 136 and 142 mounted on the central portions of the channels 124 and 126 are larger than the wheels 134, 138, 140 and 144 mounted at opposite end portions of the channel (FIGS. 2 and 4). This enables the container 20 to be turned about a vertical axis which extends through one of the wheels 136 or 142 or through the center of the container. When the container 20 is to be turned, the wheels 134, 138, 140, and 144 are disposed above a support surface, in the manner shown for the wheels 140 and 144 in FIG. 4.

When the container 20 is to be turned about a vertical axis extending through the wheel 142, a force is applied against the opposite side of the container to cause the wheel 136 to roll along an arc having its center a at vertical axis extending through the wheel 142. Similarly, when the container 20 is to be turned in the opposite direction, a force is applied to the opposite side of the container to cause the wheel 140 to roll along an arc having its center on a vertical axis which extends through the wheel 136. When the container 20 is to be supported for movement along a linear path, the container is tilted toward either the end wall panel 40 or the end wall panel 42 to move either the wheels 134 and 140 or the wheels 138 and 144 into engagement with the support surface. At this time, the container 20 is supported by four wheels.

End Wall Panel

Figure 7:
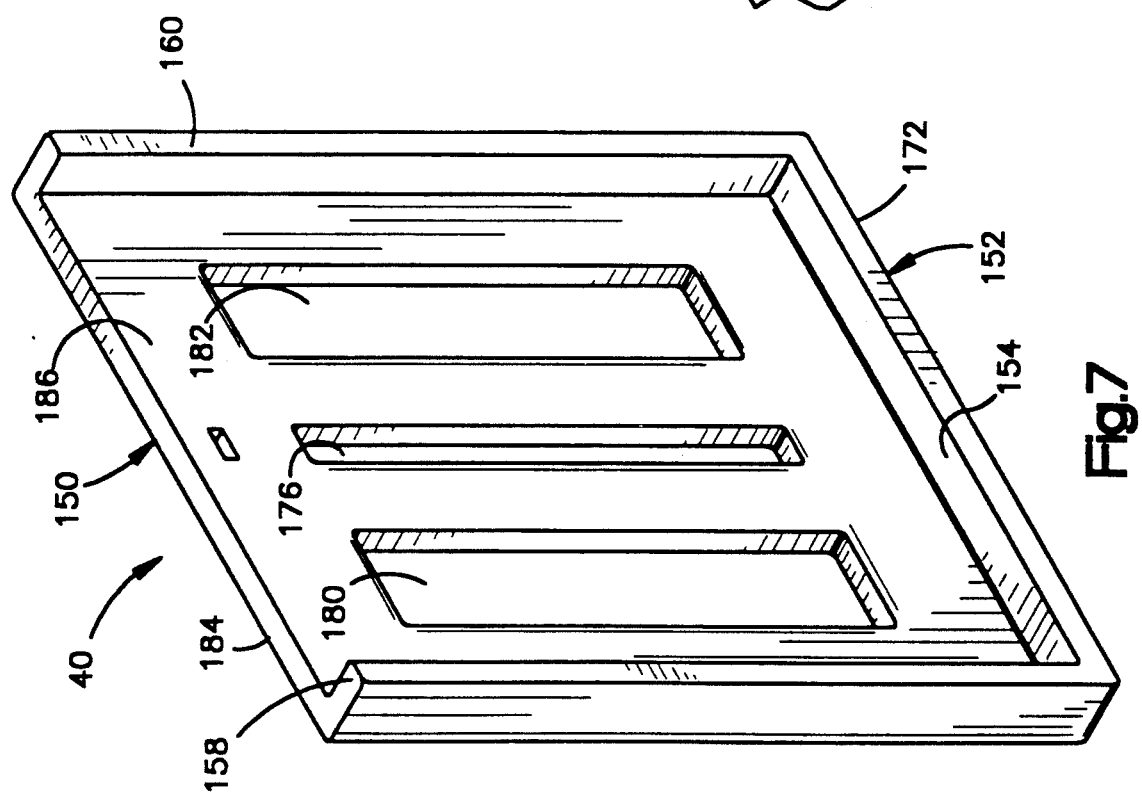
FIG. 7 is an enlarged, pictorial illustration of one of the end wall panels of the container of FIG. 1.

The end wall panel 40 (FIG. 7) is hollow and is formed as one piece of rotationally molded polymeric material. The end wall panel 40 includes a vertical main panel section 150 (FIG. 7). The flat main panel section 150 cooperates with the divider panel 46 to partially form the compartments 30 and 36 (FIG. 5).

Figure 8:
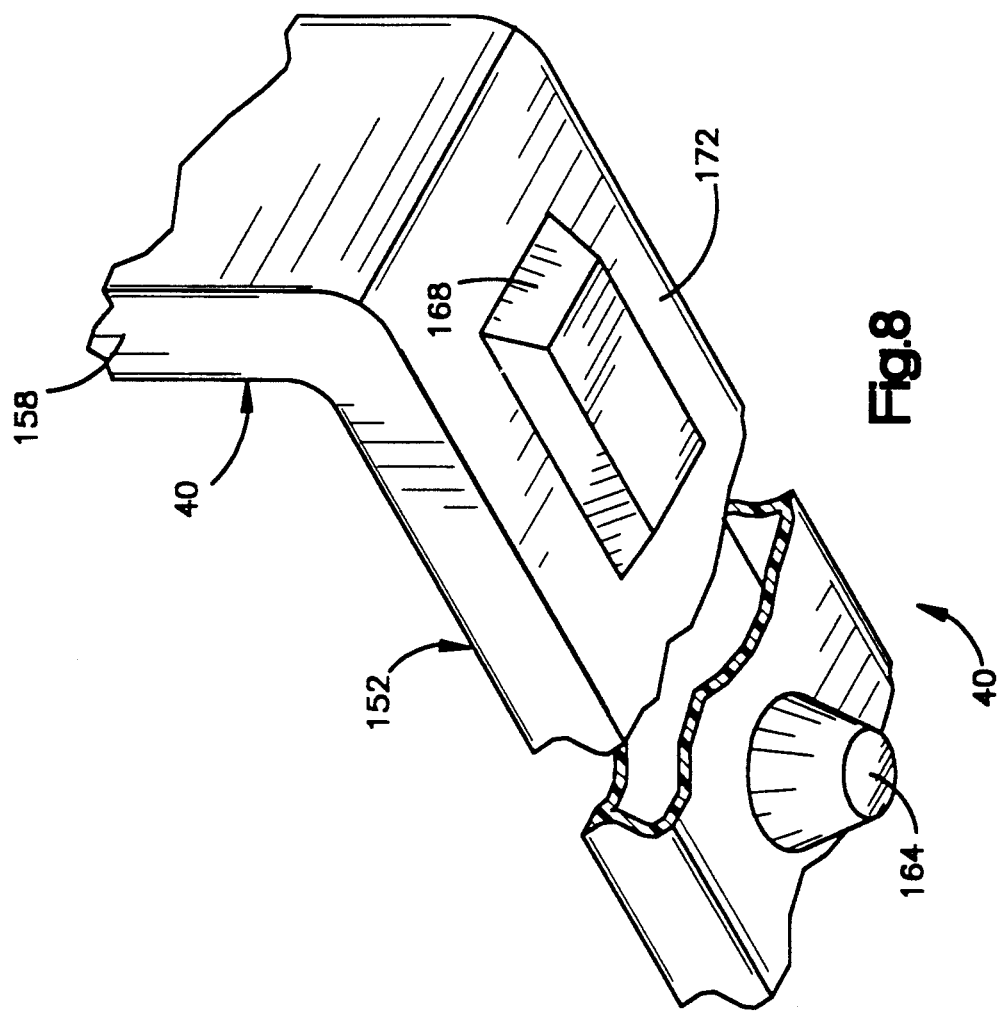
FIG. 8 is an enlarged, fragmentary pictorial illustration of a lower end portion of the end wall panel of FIG. 7.

The main panel section 150 is supported in an upright orientation on the end wall support surface 66 (FIGS. 4 and 6) by a rectangular bottom flange 152 (FIGS. 7 and 8). The bottom flange 152 is integrally formed with the main panel section 150 (FIG. 7) and interlocks the end wall panel 40 with the base 22. The bottom flange 152 has a horizontal upper side surface 154 which is engaged by the lower ends of stacks of sheet material disposed in the compartments 30 and 36. The weight applied against the flat upper side surface 154 of the bottom flange 152 firmly presses the bottom flange against the end wall support surface 66 (FIG. 6) on the base 22.

A pair of parallel side flanges 158 and 160 (FIG. 7) extend vertically upwardly from the bottom flange 154. The side flanges 158 and 160 extend perpendicular to the main panel section 150. The side flanges 158 and 160 engage the side portions of the stacks of sheet material in the compartments 30 and 36 to hold the stacks of sheet material in the compartments. In addition, the vertically extending edges of the side flanges 158 and 160 define one side of the openings along which a lift fork is moved during raising or lowering of stacks of sheet material in the compartments 30 and 36 (see FIG. 5).

The underside of the bottom flange 152 (FIG. 8) has connector projections 164 and 168. When the end wall panel 40 is in the upright orientation of FIGS. 4 and 7, the connector projections 164 and 168 extend into correspondingly shaped recesses formed in the base 22. This results in the base 22 and end wall panels 40 being interlocked to prevent relative movement between the base and end wall panel.

The circular connector projection 164 (FIG. 8) on the bottom flange 152 is formed as the frustum of a cone and extends downwardly into the circular opening 90 (FIG. 6) formed at the center of the end wall support surface 66. Similarly, the generally rectangular connector projection 168 (FIG. 8) on the bottom flange 156 extends downwardly into the opening 94 (FIG. 6) formed in the end wall support surface 66. A second rectangular connector projection (not shown) from the bottom flange 152 has the same configuration as the projection 168 and extends into the opening 92 (FIG. 6) formed in the end wall support surface 66.

The circular central projection 164 (FIG. 8) on the bottom flange 152 cooperates with the connector recess 90 (FIG. 6) in the base 22 to locate the end wall panel 40 relative to the base. The rectangular connector projection 168 on the bottom flange 152 cooperates with the connector recess 94 in the base 22 to hold the end wall panel 40 against twisting movement about an axis extending through the center of the projection 164 and recess 90. A second generally rectangular connector projection (not shown), having a configuration corresponding to the configuration of the projection 168 and located adjacent to the opposite end of the bottom flange 152, cooperates with the connector recess 92 to further hold the end wall panel 40 against twisting movement relative to the base 22.

When the end wall panel 40 is disposed on the base 22, in the manner shown in FIG. 4, the flat upper side surface 154 (FIG. 7) on the bottom flange 152 is disposed in the same horizontal plane as the support surfaces 78 and 80. Therefore, the bottom of a stack of sheet material in the compartment 30 and the bottom of a stack of sheet material in the compartment 36 rests on the support surfaces 78 and 80 disposed between the lift element channels 52 and on the upper side surface 154 of the bottom flange 152. Since the upper side surface 154 of the bottom flange 152 is in the same plane as the support surfaces 78 and 80, the bottom of a stack of signatures is supported in a flat orientation in the compartment 30 or 36. The force applied against the upwardly facing side surface 154 of the bottom flange 152 by the stacks of sheet material in the compartments 30 and 36 presses the bottom flange 152 firmly downwardly against the end wall support surface 66 on the base 42 and presses the connector projections 164 and 168 which extend downwardly from the bottom flange 152 into the recesses 90 and 94 formed in the base 22.

The upwardly extending main panel section 150 (FIG. 7) of the end wall panel 40 has a vertical central slot 176 which extends through the main panel section.

The central slot 176 engages a portion of the divider wall panel 46 to hold the divider wall panel against movement relative to the end wall panel 40. In addition, the main panel section 150 of the end wall panel 40 (FIG. 7) has a pair of rectangular openings 180 and 182 which are formed in the main panel section 150 to decrease its weight. Side walls of the openings 180 and 182 extend between parallel opposite main side surfaces 184 and 186 of the main panel section 150 to increase the flexural rigidity of the main panel section. Of course, the flexural rigidity of the main panel section 150 is contributed to by the bottom flange 152 and side flanges 158 and 160.

The end wall panel 42 (FIGS. 3, 4 and 5) is identical to the end wall panel 40 and cooperates with the base 22 in the same manner as does the end wall panel 40. Thus, the end wall panel 42 has a bottom flange 190 (FIG. 5) with a flat lower side surface which abuttingly engages the end wall support surface 68 (FIGS. 4 and 6) on the base 22. The bottom flange 190 (FIG. 5) on the end wall panel 42 has downwardly extending connector projections (not shown) which engage the recesses 100, 104, 106 (FIG. 6) in the base 22 in the same manner as in which the projections 164 and 168 on the bottom flange 152 engage the recesses 90 and 92 on the base 22. In addition, the end wall panel 42 has a pair of parallel side flanges 194 and 196 (FIG. 5) which extend from a main panel section 198 to partially form side walls of the compartments 32 and 34. The main panel section 198 of the end wall panel 42 has a vertically extending central slot 202 (FIG. 3) which extends through the end wall panel 42 and is engaged by the divider wall panel 48.

Center Wall Panel

The center wall panel 44 is disposed midway between the end wall panels 40 and 42 (FIG. 5). The center wall panel 44 cooperates with the end wall panels 40 and 42 and divider wall panels 46 and 48 to further define the compartments 30, 32, 34 and 36. Thus, a center wall panel 44 defines a portion of each of the four compartments in the container 20. The center wall panel 44, like the end wall panels 40 and 42, is hollow and is formed as one piece of polymeric material by a rotational molding process.

The center wall panel 44 has a main panel section 206 (FIGS. 2 and 5) which extends vertically upwardly from a bottom flange 208. The main panel section 206 of the center wall panel 44 is parallel to and is the same size as the main panel sections 150 and 198 of the end wall panels 40 and 42. The bottom flange 208 of the center wall panel 44 extends in opposite directions from the main panel section 206. Thus, a portion of the bottom flange 208 extends away from the main panel section 206 toward the end wall panel 40 (FIG. 5). Another portion of the bottom flange 208 extends away from the main panel section 206 toward the end wall panel 42.

A pair of side flanges 210 and 212 (FIGS. 2 and 5) extend vertically upwardly from the horizontal bottom flange 208. Like the bottom flange 208, the side flanges 210 and 212 extend in opposite directions from the main panel section 206. The side flange 210 on the center wall panel 44 is aligned with the side flanges 158 and 194 on the end wall panels 40 and 42 (FIG. 5). Similarly, the side flange 212 on the center wall panel 44 is aligned with the side flanges 160 and 196 on the end wall panels 40 and 42. This enables the bottom flange 208, side flanges 210 and 212 and main panel section 206 of the center wall panel 44 to cooperate with the end wall panels 40 and 42 to form portions of the four rectangular compartments 30, 32, 34 and 36.

The bottom flange 208 has connector projections (not shown), corresponding to the connector projections 164 and 168 (FIG. 8) from the bottom flange 152 of the end wall panel 40. The projections from the bottom flange 208 of the center wall panel 44 cooperate with the recesses 102, 108 and 110 (FIG. 6) to interlock the center wall panel 44 the base 22 in the same manner as previously described in regard to the end wall panel 40.

The bottom flange 208 has horizontally and upwardly facing side surfaces 214 and 216 (FIG. 5) disposed on opposite sides of the main panel section 206. The flat upwardly facing side surfaces 214 and 216 of the bottom flange 208 are disposed in the same plane as the support surfaces 78 and 80 between the lift element channels 52 and the support surfaces 84 and 86 between the lift element channels 54. Therefore, the upwardly facing side surfaces 214 and 216 on the bottom flange 208 of the center wall panel 44 are engaged by the flat bottom sides of stacks of sheet material disposed in the compartments 30, 32, 34 and 36 to press the center wall panel 44 firmly against the center wall support surface 70 formed on the base 22 (FIG. 6).

The main panel section 206 of the center wall panel 44 has a vertically extending central slot 218 (FIG. 2) which is engaged by the divider wall panels 46 and 48 to interlock the divider wall panels and center wall panel 44. The central slot 218 in the center wall panel 44 is aligned with the slots 176 and 202 (FIG. 2) in the end wall panels 40 and 42. A pair of rectangular openings 220 and 222 are formed in the main panel section 206 of the center wall panel 44 to decrease the weight of the center wall panel 44. In addition, the side surfaces of the openings 220 and 222 increase the flexural rigidity of the main panel section 206 of the center wall panel 44.

Divider Wall Panel

The generally rectangular divider wall panels 46 and 48 (FIG. 2) are hollow and are formed of one piece of polymeric material by a rotational molding process. The flat divider wall panel 46 has vertically extending end tabs 226 and 228 (FIG. 2) which are received in interlocking engagement with the end wall panel 40 and the center wall panel 44. Thus, the vertically extending end tab 226 is telescopically engageable with the slot 176 in the main panel section 150 of the end wall panel 40. Similarly, the vertically extending end tab 228 on the divider wall panel 46 is telescopically engageable with the vertically extending slot 218 in the main panel section 206 of the center wall panel 44. The end tabs 226 and 228 extend only half way through the slots 176 and 218 in the end wall panel 40 and center wall panel 44.

A minor side surface 229 (FIG. 2) on the divider wall panel 46, above the end tab 226, abuttingly engages an inner major side surface 230 on the inside of the main panel section 150 of the end wall panel 40. Similarly, a minor side surface 231 on the divider wall panel 46 below the end tab 226 abuttingly engages the inner major side surface 230 on the inside of the main panel section 150 of the end wall panel 40 at a location below the slot 176. The opposite end tab 228 and adjacent minor side surfaces on the divider wall panel 46 cooperate with the center wall panel 44 in the same manner as in which the end tab 226 cooperates with the end wall panel 40.

A linear lower minor edge portion 232 of the divider wall panel 46 rests on the support surfaces 78 and 80

(FIG. 4) disposed between the lift elements channels 52. The lower minor edge portion 232 of the divider wall panel also rests on the upwardly facing side 154 (FIG. 2) of the bottom flange 152 on the end wall panel 40 and on the upwardly facing side 214 (FIG. 5) of the bottom flange 208 of the center wall panel 44. Since the strap 60 (FIG. 2) holds the divider wall panel 46 in firm abutting engagement with the support surfaces 78 and 80 (FIG. 6) on the base 22, the divider wall panel 46 blocks upward movement of the end wall panel 40 and center wall panel 44 away from the base 22.

The end tabs 226 and 228 on the divider wall panel 46 cooperate with the bottoms of the slots 176 and 218 in the end wall panel 40 and center wall panel 44 to hold them against upward movement relative to the divider wall panel 46. Thus, the end tab 226 (FIG. 2) on the divider wall panel 46 engages the bottom of the slot 176 to maintain the bottom flange 152 in abutting engagement with the end wall support surface 66 on the base 22. Similarly, the end tab 228 on the divider wall panel 46 engage the bottom of the slot 176 to maintain the bottom flange 208 on the center wall panel 44 in abutting engagement with the center wall support surface 70.

The divider wall panel 48 has the same construction as the divider wall panel 46 and cooperates with the center wall panel 44, end wall panel 42, and base 22 in the same manner as does the divider wall panel 46. Thus, the divider wall panel 48 has a pair of end tabs 236 and 238 (FIG. 2). The end tab 236 is received in the slot 218 in the main panel section 206 of the center wall panel 44. Similarly, the end tab 238 is received in the slot 202 in the main panel section 198 of the end wall panel 42. The divider wall panel 48 has a linear lower minor edge portion 242 which engages the support surfaces 84 and 86 (FIG. 4).

Figure 11:
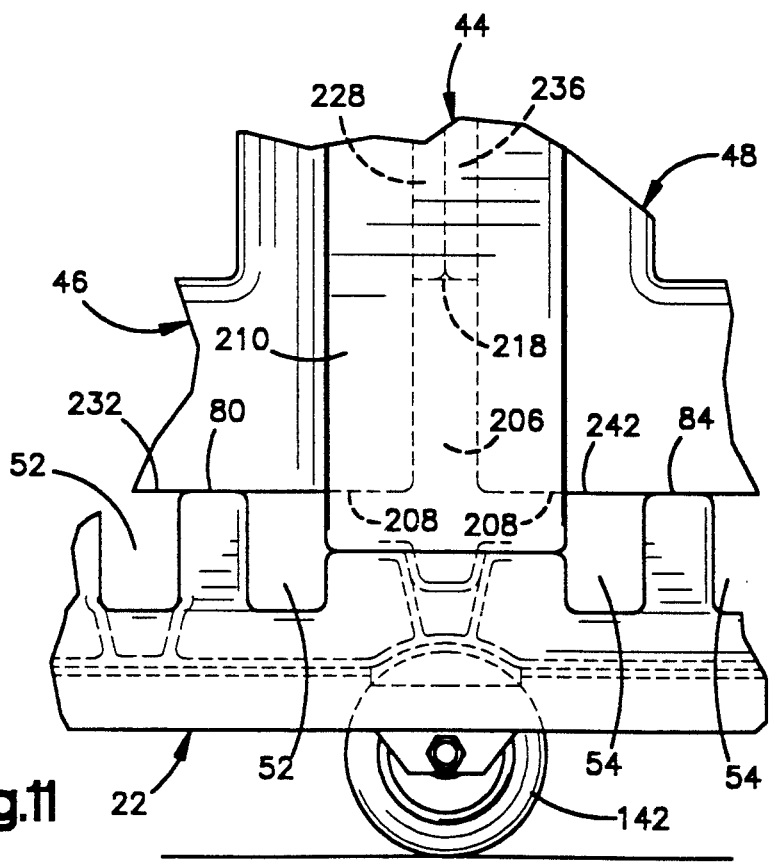
FIG. 11 is a fragmentary view elevational view, generally similar to FIG. 4, on an enlarged scale and illustrating the interlocking relationship between the base, center wall panel and a pair of divider wall panels of the container of FIG. 1.

The end tab 228 on the divider wall panel 46 extends only half way through the slot 218 in the main panel section 206 of the center wall panel 44 (FIGS. 9 and 11). The end tab 236 on the divider wall panel 48 also extends only half way through the slot 218 in the main panel section 226 of the center wall panel 44. The end tab 22 on the divider panel 46 is disposed in abutting engagement with the end tab 236 on the divider wall panel 48.

Figure 10:
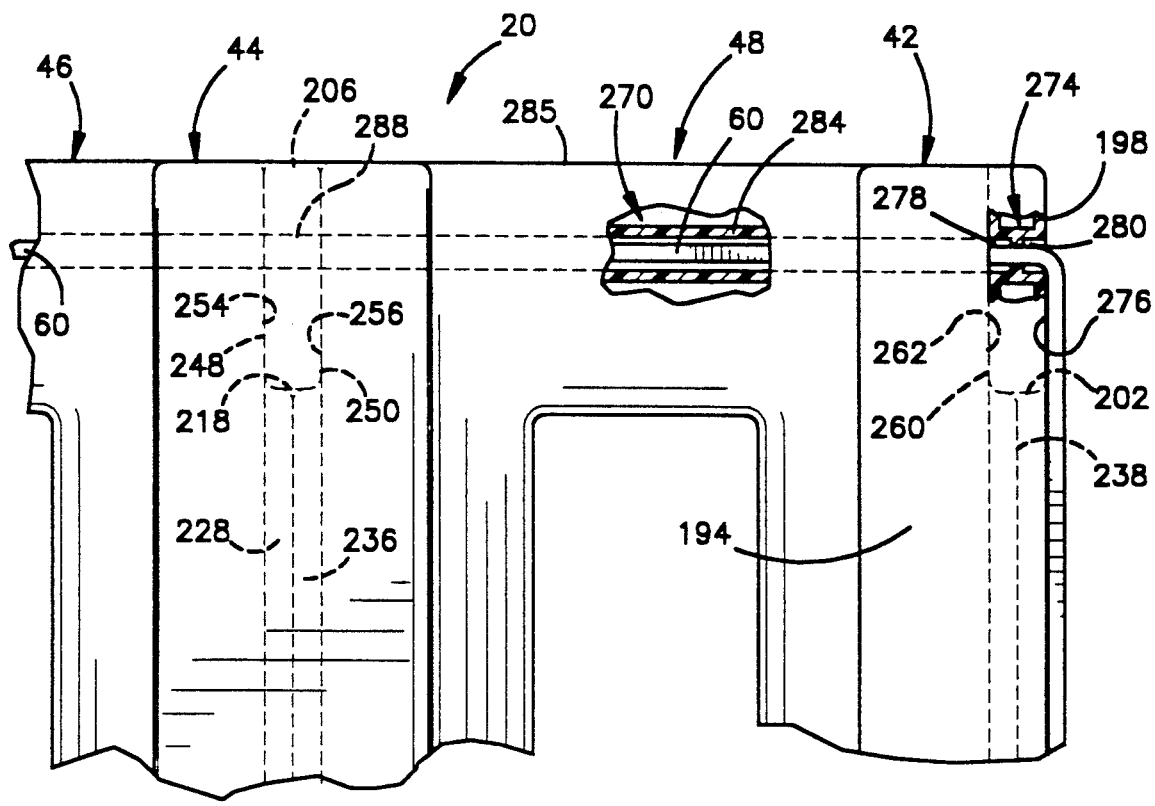
FIG. 10 is a fragmentary elevational view, generally similar to FIG. 4, on an enlarged scale and further illustrating the manner in which the strap passage extends through the end wall panel, center wall panel, and divider wall panel.

The minor side surfaces of the divider wall panels 46 and 48 above and below the end tabs 228 and 236 (see FIG. 2) are disposed in abutting engagement with opposite major side surfaces 248 and 250 of the main panel section 206. Thus, the minor side surface 254 on the divider wall panel 46 is disposed in abutting engagement with the major side surface 248 of the main panel section 206 of the center wall panel 44 (FIGS. 9 and 10). Similarly, minor side surface 256 on the divider wall panel 48 is disposed in abutting engagement with the major side surface 250 of the main panel section 206 of the center wall panel 210.

The opposite end tab 238 o the divider wall panel 48 extends into the slot 202 (FIGS. 9 and 10) formed in the main panel section 198 of the end wall panel 42. Although the slot 202 in the main panel section 198 of the end wall panel 42 extends completely through the main panel section 198, the end tab 238 extends only half way through the slot. An inwardly facing major side surface 260 on the main panel section 198 of the end wall panel 42 is abuttingly engaged by minor side surfaces on the divider panel 48 at locations above and below the slot 202. Thus, a minor side surface 262 o the divider wall panel 48 abuttingly engages the major side surface 260 on the main panel section 198 of the end wall panel 42. A minor side surface 264 (FIG. 2) on the divider wall panel 48 below the end tab 238 abuttingly engages the major side surface 260 on the main panel section 198 of the end wall panel 42 below the slot 202.

Strap Passage

The single strap 60 extends around the base 22, end wall panels 40 and 42, center wall panel 44, and divider wall panels 46 and 48 to hold them against movement relative to each other. Thus, the combination of the strap 60 and the interlocking relationship between the end wall panels 40 and 42 and center wall panel 44 with the base 22 and the interlocking relationship between the divider wall panels 46 and 48 with the end wall panels 40 and 42 and center wall panel 44 securely holds them in the desired position without resorting to the use of additional fasteners, such as nails, screws or adhesives. This enables the container 20 to be readily disassembled by merely releasing the strap 60 and sliding the interlocking surfaces on the wall panels 40, 42, 44, 46 and 48 and base 22 out of engagement. Similarly, the container 20 can be reassembled by merely sliding the interlocking surfaces on the wall panels 40, 42, 44, 46 and 48 and base 22 into engagement and securing them in place with a strap 60.

In accordance with one of the features of the present invention, the strap 60 extends through a passage 270 (FIGS. 9 and 10) formed in the upper portion of the container 20. Thus, the strap passage 270 is horizontal and extends through upper end portions of the end wall panels 40 and 42, center wall panel 44, and divider wall panels 46 and 48. The strap passage 270 holds the strap in position relative to the wall panels and prevents the strap from being pushed sideways out of position during use of the container 20. The strap passage 270 extends parallel to the strap passage 114 (FIGS. 2 and 6) in the base 22.

A portion 274 (FIG. 10) of the strap passage 270 is formed in the main panel section 198 of the end wall panel 42. The portion 274 of the passage 270 extends between the inner major side surface 260 of the main panel section 198 and an outer major side surface 276 of the main panel section 198. In the embodiment of the invention illustrated in FIG. 10, the portion 274 of the strap passage 270 is formed by first forming a pair of recesses 278 and 280 which extend inwardly from the opposite major side surfaces 260 and 276 of the main panel section 198. An opening is then formed in a web or wall interconnecting the two recesses 278 and 280. This opening is sized to freely receive the strap 60. Although it is preferred to have the portion 274 of the strap passage 270 formed as shown in FIG. 10, the portion of the strap passage in the end wall panel 42 could be upwardly opening in much the same manner as in which the portion 114 of the strap passage in the base 22 is downwardly opening.

A horizontal portion 284 of the strap passage 270 extends between opposite minor side surfaces 256 and 262 of the divider wall panel 270. The right (as viewed in FIG. 10) end of the portion 284 of the strap passage 270 is aligned with portion 274 of the strap passage extending through the end wall panel 42. Although the portion 284 of the strap passage 270 is disposed between upper and lower minor sides 242 and 285 (FIG. 2) and between major side surfaces 286 and 287 (FIG. 9) of the divider wall panel 48, the portion 284 of the strap passage 270 in the divider wall panel 148 could be upwardly opening in much the same manner as in which the portion 114 of the strap passage in the base 22 is downwardly opening.

In the illustrated embodiment of the invention, the portion 284 of the passage 270 is formed by positioning a preformed tube in the mold for the divider wall panel 48. This tube is disposed between and is molded to opposite minor sides 256 and 262 of the divider wall panel 48. The tube is spaced slightly apart from the major sides 286 an 287 of the panel 48 to facilitate molding of the panel. The tube has a longitudinally extending central opening which is sized to freely receive the strap 60.

The left (as viewed in FIG. 10) end portion of the portion 284 of the passage 270 is aligned with a horizontal portion 288 of the strap passage extending through the main panel section 206 of the center wall panel 44. The portion 288 of the strap passage 270 through the center wall panel 44 is formed in the same manner as is the portion 274 of the strap passage 270. However, the portion 288 of the strap passage 270 through the center wall panel 44 could be upwardly opening if desired.

The strap passage 270 extends through the divider wall panel 46 in the same manner previously explained in regard to the divider wall panel 48. A horizontal portion of the strap passage disposed in the left (as viewed in FIGS. 2 and 10) end wall panel 40 is aligned with a portion of the passage in the divider wall panel 46. The portion of the passage 270 which extends through the end wall panel 40 is formed in the same manner as previously explained in regard to the portion 274 of the passage extending through the end wall panel 42.

The strap 60 extends vertically downwardly from opposite ends of the horizontal strap passage 270 along the vertical outer major side surfaces of the end wall panels 40 and 42 (FIGS. 2, 3, 4 and 5). As the strap 60 extends down the opposite major sides of the end wall panels 40 and 42, the strap 60 partially blocks the slots 176 and 202 in the end wall panels 40 and 42.

The strap extends downwardly across opposite ends of the base 22 into the strap channel or passage 114 in the base. The horizontal strap channel or passage 114 is vertically aligned with the strap passage 270. The strap channel 114 in the base 22 holds the strap 60 against sidewise movement relative to the base and protects the strap during use of the container 20. Although it is preferred to form the strap channel 114 as a downwardly opening generally U-shaped passage, the strap channel 114 could be a tubular passage if desired. Although it is preferred to have the strap passage 270 (FIGS. 9 and 10) through the upper portion of the container 20 concealed within the end wall panels 40 and 42, center panel 44 and divider panels 46 and 48, the strap passage through the upper portion of the container 20 could be formed by an upwardly opening channel, if desired, in much the same manner as in which the downwardly opening channel 114 forms the strap passage through the base 22.

Conclusion

In view of the foregoing description it is apparent that the present invention provides a new and improved container 20. The container includes a plurality of wall panels 24 and 26 which are disposed on a base 22 and cooperate with the base to define a plurality of compartments 30, 32, 34 and 36 to receive stacks of sheet material. The wall panels 24 and 26 and base 22 are held against movement relative to each other by only a plurality of interlocking connector surfaces 90, 92, 94, 100, 102, 104, 106, 108, 110, 164, and 168 on the base 22 and wall panels 40, 42 and 44 and a single strap 60 which extends around the base and wall panels. This enables the container 20 to be easily disassembled by merely loosening the strap 60 and moving the interlocking surfaces on the wall panels and base 22 out of engagement.

The wall panels 40, 42, 44, 46 and 48 and base 22 are preferably formed with passages 270 and 114 through which the strap 60 extends. Thus, the container 20 includes a pair of end wall panels 40 and 42 and a center wall panel 44 which extend upwardly from the base 22. A pair of divider wall panels 46 and 48 extend between the end wall panels 40 and 42 and the center wall panel 44. The strap passage 270 may extend between opposite major side surfaces of the end and center wall panels 40, 42 and 44. The strap passage 270 may extend through the divider wall panels 46 and 48 between opposite minor side surfaces of the divider wall panels. In the base 22, the strap passage may be formed by a downwardly opening channel 114.

The base 22 is preferably formed with upwardly opening lift element receiving channels 52 and 54 to enable lift elements to be inserted and removed from beneath stacks of sheet material in compartments 30, 32, 34 and 36 of the container. The lower ends of the stacks of sheet material may engage support surfaces 78, 80, 84 and 86 disposed between the lift element channels 52 and 54. In addition, the lower ends of the stacks of sheet material may engage upwardly facing surfaces 154, 191, 214 and 216 on bottom flanges 152, 190, and 208 formed on the end wall panels 40 and 42 and center wall panel 44. Wheels 134–144, which rotate about axes which extend parallel to longitudinal central axes of the lift element channels 52 and 54, are advantageously provided on the base 22 to facilitate moving the container 20.

Having described the invention, the following is claimed:

1. A container for holding a plurality of stacks of sheet material, said container comprising a base, a plurality of wall panels disposed on said base and defining a plurality of compartments for receiving stacks of sheet material, and retainer means for holding said wall panels against movement relative to each other and against movement relative to said base, said retainer means consisting of a plurality of interlocking surfaces on said base and wall panels and a sing strap which extends around said base and wall panels to enable said container to be disassembled by loosening said strap and moving said interlocking surfaces out of engagement, said plurality of wall panels includes first and second main wall panels which are spaced apart and extend parallel to each other, said base and said first and second main wall panels having connector surfaces which are disposed in interlocking engagement to retard relative movement between said base and said main wall panels, and at least one secondary wall panel which extends perpendicular to and cooperates with central portions of said base and said first and second main wall panels to form a pair of compartments for holding stacks of sheet material with the compartments separated by said secondary wall panel, said secondary wall panel and said main wall panels having connector surfaces which are disposed in interlocking engagement to retard relative movement between said secondary wall panel and said main wall panels, said strap extending between said first and second main wall panels and along an upper end portion of said secondary wall panel throughout the distance between said first and second main wall panels, said upper end portion of said secondary wall panel including surface means for defining a passage which is disposed in said secondary wall panel and extends through said secondary wall panel from a location adjacent to said first main wall panel to a location adjacent to said second main wall panel, said strap extending between said first and second main wall panels through said passage.

2. A container as set forth in claim 1 wherein said first main wall panel includes surface means for defining a passage which extends through said first main wall panel at a location adjacent to a first end of the passage through said secondary wall panel, said second main wall panel includes surface means for defining a passage which extends through said second main wall panel at a location adjacent to a second end of the passage through said secondary wall panel, said strap extending through the passages in said first and second main wall panels.

3. A container as set forth in claim 1 wherein said base includes surface means defining a passage which extends in a direction parallel to the passage through the upper end portion of said secondary wall panel, said strap extending through the passage in said base.

4. A container as set forth in claim 1 wherein said base includes surface means for defining a plurality of upwardly opening channels which extend between opposite edge portions of said base and parallel to said first and second main wall panels to receive members for engaging the lower end portion of a stack of sheet material in a first one of the pair of compartments and to receive members for engaging the lower end portion of a stack of sheet material in a second one of the pair of compartments.

5. A container for holding a plurality of stacks of sheet material, said container comprising a base, first and second main wall panels extending upwardly from said base, each of said first and second main wall panels having a pair of upright major sides, said base and said first and second main wall panels having connector surface means which are disposed in interlocking engagement to retard relative movement between said base and said first and second main wall panels, a secondary wall panel extending upwardly from said base and extending between central portions of said first and second main wall panels, said secondary wall panel having a pair of upright major sides which extend perpendicular to the upright major sides of said first and second main wall panels, said secondary wall panel having first and second minor sides which are upright and extend between said major sides of said secondary wall panel, said secondary wall panel and said first and second main wall panels having connector surface means which are disposed in interlocking engagement at central portions of said first and second main wall panels to retard relative movement between said secondary wall panel and said first and second main wall panels, said secondary wall panel cooperating with said first and second main wall panels and said base to at least partially define first and second compartments disposed between said first and second main wall panels and disposed on opposite sides of said secondary wall panel, said secondary wall panel including surface means for defining a first passage which is disposed between surface areas on the major sides of said secondary wall panel and extends parallel to the major sides of said secondary wall panel, said first passage having a first end portion which is disposed at the first minor side of said secondary wall panel and a second end portion which is disposed at the second minor side of said secondary wall panel, said first passage extending along an upper end portion of said secondary wall panel throughout the distance between said first and second main wall panels, said first main wall panel including surface means for defining a second passage which is formed in the central portion of said first main wall panel, said second passage having a first end portion disposed at a first major side of said first main wall panel adjacent to the first end portion of said first passage, said second main wall panel including surface means for defining a third passage which is formed in the central portion of said second main wall panel, said third passage having a first end portion disposed at a first major side of said second main wall panel adjacent to the second end portion o said first passage, and strap means for holding said main and secondary wall panels against movement relative to each other, said strap means extending through said first, second and third passages in said main and secondary wall panels, a portion of said strap means which extends between the first and second end portions of said first passage being disposed between surface areas on the major sides of said secondary wall panel.

6. A container as set forth in claim 5 wherein said base includes surface means for defining a plurality of upwardly opening passages each of which extend between opposite edge portions of said base, said surface means including means for defining a plurality of longitudinally extending stack support surfaces disposed between said upwardly openings passages, each of said stack support surfaces extending between opposite edge portions of said base to engage the bottoms of stacks of sheet material disposed in the first and second compartments, said secondary wall panel having a third minor side which extends between said major sides of said secondary wall panel and between said first and second minor sides of said secondary wall panel, said third minor side of said secondary wall panel being disposed in abutting engagement with said plurality of stack support surfaces disposed between said upwardly opening passages, said upwardly opening passages being adapted to receive members for engaging the lower end portions of stacks of sheet material disposed in said first and second compartments.

7. A container as set forth in claim 6 wherein said base further includes a first main wall support surface which is disposed beneath a plane containing said plurality of stack support surfaces, and a second main wall support surface which is disposed beneath the plane containing said plurality of stack support surfaces, said first main wall panel having a bottom flange which engages said first main wall support surface, said bottom flange on said first main wall panel having a first stack support surface which is disposed in the plane containing said plurality of stack support surfaces, said second main wall panel having a bottom flange which engages said second main wall support surface, said bottom flange on said second main wall panel having a second stack support surface which is disposed in the plane containing said plurality of stack support surfaces.

8. A container as set forth in claim 7 wherein said third minor side of said secondary wall panel is disposed in abutting engagement with said stack support surfaces on said bottom flanges of said first and second main wall panels.

9. A container as set forth in claim 6 further including a plurality of wheels for supporting said base, each of said wheels being rotatable about an axis which extends parallel to the major sides of said first an second main wall panels and to longitudinal central axes of said upwardly opening passages in said base.

10. A container as set forth in claim 5 wherein said secondary wall panel has third and fourth minor sides which extend transversely to said first and second minor sides and extend between major sides of said secondary wall panel, said first passage being disposed in said secondary wall panel between said third and fourth minor sides of said secondary wall panel.

11. A container as set forth in claim 10 wherein said first passage has a longitudinal central axis which extends parallel to the major sides of said secondary wall panel and parallel to the third and fourth minor sides of said secondary wall panel.

12. A container as set forth in claim 5 wherein said first and second main wall panels each include surface means for defining a vertical slot in a central portion of each of said first and second main wall panels, said secondary wall panel having a first retaining tab portion which is received in the slot in said first main wall panel and a second retaining tab portion which is received in the slot in said second main wall panel, said first passage being formed in a portion of said secondary wall panel disposed above said first and second retaining tab portions, said second passage extending between the upright major sides of said first main wall panel at a location above and in vertical alignment with the slot in said first main wall panel, said third passage extending between the upright major sides of said second main wall panel at a location above and in vertical alignment with the slot in said second main wall panel.

13. A container as set forth in claim 12 wherein the slots in said first and second main wall panels extend through said first and second main wall panels.

14. A container as set forth in claim 5 wherein said strap means is disposed in engagement with a side of said base opposite from a side of said base from which said first and second main wall panels and said secondary wall panel extend upwardly to enable said strap means to apply a downwardly directed force against said first and second main wall panels and said secondary wall panel to press them against said base.

15. A container for holding a plurality of stacks of sheet material, said container comprising a rectangular base, said base including a first longitudinally extending main wall support surface disposed at a first end portion of said base, a second longitudinally extending main wall support surface disposed at a second end portion of said base opposite from said first end portion of said base, said second main wall support surface having a longitudinal central axis which extends parallel to a longitudinal central axis of said first main wall support surface, a third longitudinally extending main wall support surface disposed between and spaced apart from said first and second main wall support surfaces, said third main wall support surface having a longitudinal central axis which extends parallel to longitudinal central axes of said first and second main wall support surfaces, a first plurality of upwardly opening and longitudinally extending lift element channels disposed between said first and third main wall support surfaces and having longitudinally central axes which extend parallel to longitudinal central axes of said first and third main wall support surfaces, at least some of the channels of said first plurality of lift element channels having open ends in a first edge portion of said base, said first edge portion of said base extending between the first and second end portions of said base, at least some of the channels of said first plurality of lift element channels having open ends in a second edge portion of said base which is disposed opposite to said first edge portion of said base and extends between the first and second end portions of said base, a first plurality of longitudinally extending stack support surfaces disposed between the channels of said first plurality of lift element channels to engage the bottoms of stacks of sheet material disposed in said container, said first plurality of stack support surfaces having longitudinal central axes which extend parallel to longitudinal central axes of said first plurality of lift element channels, said first plurality of stack support surfaces being disposed in a support plane which is located above said first, second and third main wall support surfaces, a second plurality of upwardly opening and longitudinally extending lift element channels disposed between said second and third main wall support surfaces and having longitudinal central axes which extend parallel to longitudinal central axes of said second and third main wall support surfaces, at least some of the channels of said second plurality of lift element channels having open ends in the first edge portion of said base, at least some of the channels of said second plurality of lift channels having open ends in the second edge portion o said base, a second plurality of longitudinally extending stack support surfaces disposed between the channels of said second plurality of lift element channels to engage the bottoms of stacks of sheet material disposed in said container, said second plurality of stack support surfaces having longitudinal central axes which extend parallel to longitudinal central axes of said second plurality of lift element channels, said second plurality of stack support surfaces being disposed in the support plane with said first plurality of stack support surfaces, a first main wall panel having a first bottom flange at a lower end portion of said first main wall panel, said first bottom flange having a lower side surface disposed in abutting engagement with said first main wall support surface on said base, said first bottom flange having a first upper side surface which is disposed in the support plane with said first plurality of stack support surfaces, said first main wall panel having a first main panel section which extends upwardly from said first bottom flange and a first pair of side flanges, said first pair of side flanges extending perpendicular to said first main panel section and extending upwardly from said first bottom flange, said first pair of side flanges extending inwardly from said first main panel section toward said first plurality of stack support surfaces, a second main wall panel having a second bottom flange at a lower end portion of said second main wall panel, said second bottom flange having a lower side surface disposed in abutting engagement with said second main wall support surface on said base, said second bottom flange having a second upper side surface which is disposed in the support plane with said second plurality of stack support surfaces, said second main wall panel having a second main panel section which extends upwardly from said second bottom flange and a second pair of side flanges, said second main panel section extending parallel to said first main panel section, said second pair of side flanges extending perpendicular to said second main panel section and extending upwardly from said second bottom flange, said second pair of side flanges extending inwardly from said second main panel section toward said second plurality of stack support surfaces, a third main wall panel having a third bottom flange at a lower end portion of said third main wall panel, said third bottom flange having a lower side surface disposed in abutting engagement with said third main wall support surface on said base, said third main wall panel having a third main panel section which is parallel to said first and second main panel sections and a third pair of side flanges, said third main panel section extending upwardly from a central portion of said third bottom flange, said third pair of side flanges extending perpendicular to and in opposite directions from said third main panel section and extending upwardly from said third bottom flange, said third pair of side flanges extending inwardly in opposite directions from said third main panel section toward said first plurality of stack support surfaces and toward said second plurality of stack support surfaces, said third bottom flange having a third upper side surface which extends from one side of said third main panel section toward said first plurality of stack support surfaces and a fourth upper side surface which extends from a side of said third main panel section opposite to said one side toward said second plurality of stack support surfaces, said third and fourth upper side surfaces on said third bottom flange being disposed in the support plane with said first and second pluralities of stack support surfaces, a first secondary wall panel extending upwardly from said base and extending between central portions of said first and third main wall panels, said first secondary wall panel cooperating with said base and said first and third main wall panels to form a first compartment disposed adjacent to a first side of said first secondary wall panel to receive a first stack of sheet material with a lower end of the first stack of sheet material in engagement with said first plurality of stack support surfaces on said base and with said first upper side surface of said first bottom flange and with said third upper side surface of said third bottom flange, said first secondary wall panel cooperating with said base and said first and third main wall panels to form a second compartment disposed adjacent to a second side of said first secondary wall panel to receive a second stack of sheet material with a lower end of the second stack of sheet material in engagement with said first plurality of stack support surfaces on said base and with said first upper side surface of said first bottom flange and wit said third upper side surface of said third bottom flange, said first secondary wall panel having a lower end portion which is disposed in engagement with said first plurality of stack support surfaces on said base and with said first upper side surface on said first bottom flange and with said third upper side surface on said third bottom flange, and a second secondary wall panel extending between central portions of said second and third main wall panels, said second secondary wall panel cooperating with said base and said second and third main wall panels to form a third compartment disposed adjacent to a first side of said second secondary wall panel to receive a third stack of sheet material with a lower end of the third stack of sheet material in engagement with said second plurality of stack support surfaces on said base and with said second upper side surface of said second bottom flange and with said fourth upper side surface of said third bottom flange, said second secondary wall panel cooperating with said base and said second and third main wall panels to form a fourth compartment disposed adjacent to a second side of said second secondary wall panel to receive a fourth stack of sheet material with a lower end of the fourth stack of sheet material in engagement with said second plurality of stack support surfaces on said base and with said second upper side surface of said second bottom flange and with said fourth upper side surface of said third bottom flange.

16. A container as set forth in claim 15 wherein said base includes a longitudinally extending strap channel having a longitudinal axis which extends perpendicular to the longitudinal axes of said first and second pluralities of lift element channels, said container further including a strap which extends through said strap channel and engages said first, second and third main wall panels and said first and second secondary wall panels to retard relative movement between said base and said wall panels.

17. A container as set forth in claim 15 further including a single strap which extends around said first, second and third main wall panels to retard relative movement between said first, second and third main wall panels.

18. A container as set forth in claim 15 further including a plurality of wheels connected with said base and rotatable relative to said base, each of the wheels of said plurality of wheels being rotatable about an axis extending parallel to the longitudinal central axes of said first and second pluralities of lift element channels.

19. A container as set forth in claim 15 wherein said first bottom flange and said base have first connector surface means which are disposed in interlocking engagement to retard relative movement between said first main wall panel and said base, said second bottom flange and said base having second connector surface means which are disposed in interlocking engagement to retard relative movement between said second main wall panel and said base, said third bottom flange and said base having third connector surface means which are disposed in interlocking engagement to retard relative movement between said third main wall panel and said base.

20. A container for holding a plurality of stacks of sheet material, said container comprising a rectangular base having first and second end portions, a first plurality of upwardly opening and longitudinally extending lift element channels disposed in said base, at least some of the channels of said first plurality of lift element channels having open ends in a first edge portion of said base, said first edge portion of said base extending between the first and second end portions of said base, at least some of the channels of said first plurality of lift element channels having open ends in a second edge portion of said base which is disposed opposite to said first edge portion of said base and extends between the first and second end portions of said base, a first plurality of longitudinally extending stack support surfaces disposed between the channels of said first plurality of lift element channels to engage the bottoms of stacks of sheet material disposed in said container, a second plurality of upwardly opening and longitudinally extending lift element channels disposed in said base, at least some of the channels of said second plurality of lift element channels having open ends in the first edge portion of said base, at least some of the channels of said second plurality of lift channels having open ends in the second edge portion of said base, a second plurality of longitudinally extending stack support surfaces disposed between the channels of said second plurality of lift element channels to engage the bottoms of stacks of sheet material disposed in said container, a first main wall panel connected with said base at a location adjacent to the first end portion of said base, a second main wall panel connected with said base at a location adjacent to the second end portion of said base, said second main wall panel extending parallel to said first main wall panel, a third main wall panel connected with a central portion of said base and disposed midway between said first and second main wall panels, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material with a lower end of the first stack of sheet material in engagement with said first plurality of stack support surfaces on said base, said first secondary wall panel cooperating with said base and said first and third main wall panels to form a second compartment having an open upper end portion and disposed adjacent to a second side of said first secondary wall panel to receive a second stack of sheet material with a lower end of the second stack of sheet material in engagement with said first plurality of stack support surfaces on said base, and a second secondary wall panel extending between central portions of said second and third main wall panels, said secondary wall panel cooperating with said base and said second and third main wall panels to form a third compartment having an open upper end portion and disposed adjacent to a first side of said second secondary wall panel to receive a third stack of sheet material with a lower end of the third stack of sheet material in engagement with said second plurality of stack support surfaces on said base, said second secondary wall panel cooperating with said base and second and third main wall panels to form a fourth compartment having an open upper end portion and disposed adjacent to a second side of said second secondary wall panel to receive a fourth stack of sheet material with a lower end of the fourth stack of sheet material in engagement with said second plurality of stack support surfaces on said base.

21. A container as set forth in claim 20 further including first surface means for defining a first side opening extending upwardly from said first edge portion of said base to the open upper end portion of said first compartment, second surface means for defining a second side opening extending upwardly from said second edge portion of said base to the open upper end portion of said second compartment, said first and second side openings being disposed on opposite sides of said container between said first and third main wall panels, third surface means for defining a third side opening extending upwardly from said first edge portion of said base to the open upper end portion of said third compartment, fourth surface means for defining a fourth side opening extending upwardly from said second edge portion of said base to the open upper end portion of said fourth compartment, said third and fourth side openings being disposed on opposite sides of said container between said second and third main wall panels.

22. A container as set forth in claim 20 wherein said first main wall panel includes a first side flange which extends perpendicular to a major side surface of said first main wall panel and extends upwardly from said first edge portion of said base to the open upper end portion of said first compartment and a second side flange which extends perpendicular to the major side surface of said first main wall panel and extends upwardly from said second edge portion of said base to the open upper end portion of said second compartment, said second main wall panel including a third side flange which extends perpendicular to a major side surface of said second main wall panel and extends upwardly from said first edge portion of said base to the open upper end portion of said third compartment and a fourth side flange which extends perpendicular to the major side surface of said second main wall panel and extends upwardly from said second edge portion of said base to the open upper end portion of said fourth compartment, said third main wall panel including a fifth side flange which is perpendicular to a major side surface of said third main wall panel and which extends in opposite directions from the major side surface of said third main wall panel and which extends upwardly from said first edge portion of said base to the open upper end portions of said first and third compartments, said third main wall panel including a sixth side flange which is perpendicular to the major side surface of said third main wall panel and which extends in opposite directions from the major side surface of said third main wall panel and which extends upwardly from said second edge portion of said base to the open upper end portions of said second and fourth compartments.

23. A container as set forth in claim 22 wherein said first side flange and said fifth side flange have surface means which at least partially defines a first side opening having a width which is less than the distance between said first and third main wall panels, said first side opening extending upwardly from said first edge portion of said base to the open upper end portion of said first compartment, said second side flange and said sixth side flange having surface means which at least partially defines a second side opening having a width which is less than the distance between said first and third main wall panels, said second side opening extending upwardly from said second edge portion of said base to the open upper end portion of said second compartment, said third side flange and said fifth side flange having surface means which at least partially defines a third side opening having a width which is less than the distance between said second and third main wall panels, said third side opening extending upwardly from said first edge portion of said base to the open upper end portion of said third compartment, said fourth side flange and said sixth side flange having surface means which at least partially defines a fourth side opening having a width which is less than the distance between said second and third main wall panels, said fourth side opening extending upwardly from said second edge portion of said base to the open upper end portion of said fourth compartment.

24. A container for holding a plurality of stacks of sheet material, said container comprising a rectangular base having first and second end portions, a first edge portion extending between the first and second end portions of said base, and a second edge portion extending between the first and second end portions of said base, a first main wall panel connected with said base at a location adjacent to the first end portion of said base, a second main wall panel connected with said base at a location adjacent to the second end portion of said base, said second main wall panel extending parallel to said first main wall panel, a third main wall panel connected with a central portion of said base and disposed midway between said first and second main wall panels, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material, said first secondary wall panel cooperating with said base and said first and third main wall panels to form a second compartment having an open upper end portion and disposed adjacent to a second side of said first secondary wall panel to receive a second stack of sheet material, a second secondary wall panel extending between central portions of said second and third main wall panels, said secondary wall panel cooperating with said base and said second and third main wall panels to form a third compartment having an open upper end portion and disposed adjacent to a first side of said second secondary wall panel to receive a third stack of sheet material, said second secondary wall panel cooperating with said base and second and third main wall panels to form a fourth compartment having an open upper end portion and disposed adjacent to a second side of said second secondary wall panel to receive a fourth stack of sheet material, first surface means for defining a first side opening extending upwardly from said first edge portion of said base to the open upper end portion of said first compartment, second surface means for defining a second side opening extending upwardly from said second edge portion of said base to the open upper end portion of said second compartment, said first and second side openings being disposed on opposite sides of said container between said first and third main wall panels, third surface means for defining a third side opening extending upwardly from said first edge portion of said base to the open upper end portion of said third compartment, and fourth surface means for defining a fourth side opening extending upwardly from said second edge portion of said base to the open upper end portion of said fourth compartment, said third and fourth side openings being disposed on opposite sides of said container between said second and third main wall panels.

25. A container as set forth in claim 24 wherein said first main wall panel includes a first side flange which extends perpendicular to a major side surface of said first main wall panel and extends upwardly from said first edge portion of said base to the open upper end portion of said first compartment and a second side flange which extends perpendicular to the major side surfaces of said first main wall panel and extends upwardly from said second edge portion of said base to the open upper end portion of said second compartment, said second main wall panel including a third side flange which extends perpendicular to a major side surface of said second main wall panel and extends upwardly from said first edge portion of said base to the open upper end portion of said third compartment and a fourth side flange which extends perpendicular to the major side surface of said second main wall panel and extends upwardly from said second edge portion of said base to the open upper end portion of said fourth compartment, said third main wall panel including a fifth side flange which is perpendicular to a major side surface of said third main wall panel and which extends in opposite directions from the major side surface of said third main wall panel and which extends upwardly from said first edge portion of said base to the open upper end portions of said first and third compartments, said third main wall panel including a sixth side flange which is perpendicular to the major side surface of said third main wall panel and which extends in opposite directions from the major side surface of said third main wall panel and which extends upwardly from said second edge portion of said base to the open upper end portions of said second and fourth compartments, said first surface means being at least partially disposed on said first and fifth side flanges, said second surface means being at least partially disposed on said second and sixth side flanges, said third surface means being at least partially disposed on said third and fifth side flanges, and said fourth surface means being at least partially disposed on said fourth and sixth side flanges.

26. A container as set forth in claim 24 wherein said base includes a longitudinally extending strap channel having a longitudinal axis which extends parallel to the major side surfaces of said first and second secondary wall panels, said container further including a strap which extends through said strap channel and engages said first, second and third main wall panels and said first and second secondary wall panels to retard relative movement between said base and said wall panels.

27. A container for holding a plurality of stacks of sheet material, said container comprising a rectangular base having first and second end portions, a first edge portion extending between the first and second end portions of said base, and a second edge portion between the first and second end portions of said base, a first main wall panel connected with said base at a location adjacent to the first end portion of said base, a second main wall panel connected with said base at a location adjacent to the second end portion of said base, said second main wall panel extending parallel to said first main wall panel, a third main wall panel connected with a central portion of said base and disposed midway between said first and second main wall panels, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material, said first secondary wall panel cooperating with said base and said first and third main wall panels to form a second compartment having an open upper end portion and disposed adjacent to a second side of said first secondary wall panel to receive a second stack of sheet material, a second secondary wall panel extending between central portions of said second and third main wall panels, said secondary wall panel cooperating with said base and said second and third main wall panels to form a third compartment having an open upper end portion and disposed adjacent to a first side of said second secondary wall panel to receive a third stack of sheet material, said second secondary wall panel cooperating with said base and second and third main wall panels to form a fourth compartment having an open upper end portion and disposed adjacent to a second side of said second secondary wall panel to receive a fourth stack of sheet material, said first main wall panel includes a first side flange which extends perpendicular to a major side surface of said first main wall panel and extends upwardly from said first edge portion of said base to the open upper end portion of said first compartment and a second side flange which extends perpendicular to the major side surfaces of said first main wall panel and extends upwardly from said second edge portion of said base to the open upper end portion of said second compartment, said second main wall panel including a third side flange which extends perpendicular to a major side surface of said second main wall panel and extends upwardly from said first edge portion of said base to the open upper end portion of said third compartment and a fourth side flange which extends perpendicular to the major side surface of said second main wall panel and extends upwardly from said second edge portion of said base to the open upper end portion of said fourth compartment, said third main wall panel including a fifth side flange which is perpendicular to a major side surface of said third main wall panel and which extends in opposite directions from the major side surface of said third main wall panel and which extends upwardly from said first edge portion of said base to the open upper end portions of said first and third compartments, said third main wall panel including a sixth side flange which is perpendicular to the major side surface of said third main wall panel and which extends in opposite directions from the major side surface of said third main wall panel and which extends upwardly from said second edge portion of said base to the open upper end portions of said second and fourth compartments.

28. A container as set forth in claim 27 wherein said first side flange and said fifth side flange have surface means which at least partially defines a first side opening having a width which is less than the distance between said first and third main wall panels, said first side opening extending upwardly from said first edge portion of said base to the open upper end portion of said first compartment, said second side flange and said sixth side flange having surface means which at least partially defines a second side opening having a width which is less than the distance between said first and third main wall panels, said second side opening extending upwardly from said second edge portion of said base to the open upper end portion of said second compartment, said third side flange and said fifth side flange having surface means which at least partially defines a third side opening having a width which is less than the distance between said second and third main wall panels, said third side opening extending upwardly from said first edge portion of said base to the open upper end portion of said third compartment, said fourth side flange and said sixth side flange having surface means which at least partially defines a fourth side opening having a width which is less than the distance between said second and third main wall panels, said fourth side opening extending upwardly from said second edge portion of said base to the open upper end portion of said fourth compartment;.

29. A container for holding a plurality of stacks of sheet material, said container comprising a rectangular base having first and second end portions, a first edge portion extending between the first and second end portions of said base, and a second edge portion extending between the first and second end portions of said base, a first main wall panel connected with said base at a location adjacent to the first end portion of said base, a second main wall panel connected with said base at a location adjacent to the second end portion of said base, said second main wall panel extending parallel to said first main wall panel, a third main wall panel connected with a central portion of said base and disposed midway between said first and second main wall panels, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material, said first secondary wall panel cooperating with said base and said first and third main wall panels to form a second compartment having an open upper end portion and disposed adjacent to a second side of said first secondary wall panel to receive a second stack of sheet material, and a second secondary wall panel extending between central portions of said second and third main wall panels, said secondary wall panel cooperating with said base and said second and third main wall panels to form a third compartment having an open upper end portion and disposed adjacent to a first side of said second secondary wall panel to receive a third stack of sheet material, said second secondary wall panel cooperating with said base and second and third main wall panels to form a fourth compartment having an open upper end portion and disposed adjacent to a second side of said second secondary wall panel to receive a fourth stack of sheet material, said first, second and third main wall panels have upper end portions with surface means for defining passages which extend through said first, second and third main wall panels in directions perpendicular to major side surfaces of said first, second and third main wall panels, said first and second secondary wall panels having upper end portions with surface means for defining passages which extend through said first and second secondary wall panels in directions parallel to major side surfaces of said first and second secondary wall panels, said container further including a strap which extends through said passages in said first, second and third main wall panels and through said passages in said first and second secondary wall panels.

30. A container as set forth in claim 29 wherein said base includes surface means which defines a passage extending along a side of said base opposite from said first, second and third main wall panels, said strap extending through said passage in said base.

31. A container as set forth in claim 29 further including a first plurality of interlocking surfaces on said base and said first main wall panel for interconnecting said base and said first main wall panel, a second plurality of interlocking surfaces on said base and said second main wall panel for interconnecting said base and said second main wall panel, and a third plurality of interlocking surfaces on said base and said third main wall panel for interconnecting said base and said third main wall panel.

32. A container for holding a plurality of stacks of sheet material, said container comprising a rectangular base having first and second end portions, a first edge portion extending between the first and second end portions of said base, and a second edge portion extending between the first and second end portions of said base, a first main wall panel connected with said base at a location adjacent to the first end portion of said base, a second main wall panel connected with said base at a location adjacent to the second end portion of said base, said second main wall panel extending parallel to said first main wall panel, a third main wall panel connected with a central portion of said base and disposed midway between said first and second main wall panels, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material, said first secondary wall panel cooperating with said base and said first and third main wall panels to form a second compartment having an open upper end portion and disposed adjacent to a second side of said first secondary wall panel to receive a second stack of sheet material, a second secondary wall panel extending between central portions of said second and third main wall panels, said secondary wall panel cooperating with said base and said second and third main wall panels to form a third compartment having an open upper end portion and disposed adjacent to a first side of said second secondary wall panel to receive a third stack of sheet material, said second secondary wall panel cooperating with said base and second and third main wall panels to form a fourth compartment having an open upper end portion and disposed adjacent to a second side of said second secondary wall panel to receive a fourth stack of sheet material, said first and second secondary wall panels having parallel major side surfaces, said base including a longitudinally extending strap channel having a longitudinal axis which extends parallel to the major side surfaces of said first and second secondary wall panels, said container further including a strap which extends through said strap channel and engages said first, second and third main wall panels and said first and second secondary wall panels to retard relative movement between said base and said wall panels.

33. A container as set forth in claim 32 further including a plurality of upwardly opening lift element channels in said base, first surface means for defining a first side opening extending upwardly from some of said lift element channels in said base to the open upper end portion of said first compartment, second surface means for defining a second side opening extending upwardly from some of said lift element channels in said base to the open upper end portion of said second compartment, said first and second side openings being disposed on opposite sides of said container between said first and third main wall panels, third surface means for defining a third side opening extending upwardly from some of said lift element channels in said base to the open upper end portion of said third compartment, fourth surface means for defining a fourth side opening extending upwardly from some of said lift element channels in said base to the open upper end portion of said fourth compartment, said third and fourth side openings being disposed on opposite sides of said container between said second and third main wall panels.

34. A container for holding a plurality of stacks of sheet material, said container comprising a rectangular base, said base including a first longitudinally extending main wall support surface disposed at a first end portion of said base, a second longitudinally extending main wall support surface disposed at a second end portion of said base opposite from said first end portion of said base, said second main wall support surface having a longitudinal central axis which extends parallel to a longitudinal central axis of said first main wall support surface, a third longitudinally extending main wall support surface disposed between and spaced apart from said first and second main wall support surfaces, said third main wall support surface having a longitudinal central axis which extends parallel to longitudinal central axes of said first and second main wall support surfaces, a first stack support surface area disposed on said base between said first and second main wall support surfaces to engage the bottoms of stacks of sheet material disposed in said container, said first stack support surface area being disposed in a support plane which is located above said first, second and third main wall support surfaces, a second stack support surface area disposed on said base between said second and third main wall support surfaces to engage the bottoms of stacks of sheet material disposed in said container, said second stack support surface area being disposed in a support plane which is located above said first, second and third wall support surfaces, a first main wall panel having a first bottom flange at a lower end portion of said first main wall panel, said first bottom flange having a lower side surface disposed in abutting engagement with said first main wall support surface on said base, said first bottom flange having a first upper side surface which is disposed in the support plane with said first stack support surface area, said first main wall panel having a first main panel section which extends upwardly from said first bottom flange, a second main wall panel having a second bottom flange at a lower end portion of said second main wall panel, said second bottom flange having a lower side surface disposed in abutting engagement with said second main wall support surface on said base, said second bottom flange having a second upper side surface which is disposed in the support plane with said second stack support surface area, said second main wall panel having a second main panel section which extends upwardly from said second bottom flange, said second main panel section extending parallel to said first main panel section, a third main wall panel having a third bottom flange at a lower end portion of said third main wall panel, said third bottom flange having a lower side surface disposed in abutting engagement with said third main wall support surface on said base, said third main wall panel having a third main panel section which is parallel to said first and second main panel sections, said third main panel section extending upwardly from a central portion of said third bottom flange, said third bottom flange having a third upper side surface which extends from one side of said third main panel section toward said first stack support surface area and a fourth upper side surface which extends from a side of said third main panel section opposite to said one side toward said second stack support surface area, said third upper side surface on said third bottom flange being disposed in the support plane with said first stack support surface area, said fourth upper side surface on said third bottom flange being disposed in the support plane with said second stack support surface area, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material with a lower end of the first stack of sheet material in engagement with a portion of said first stack support surface area on said base and with said first upper side surface of said first bottom flange and with said third upper side surface of said third bottom flange, said first secondary wall panel cooperating with said base and said first and third main wall panels to form a second compartment having an open upper end portion and disposed adjacent to a second side of said first secondary wall panel to receive a second stack of sheet material with a lower end of the second stack of sheet material in engagement with a portion of said first stack support surface area on said base and with said first upper side surface of said first bottom flange and with said third upper side surface of said third bottom flange, said first secondary wall panel having a lower end portion which is disposed in engagement with said first stack support surface area on said base and with said first upper side surface on said first bottom flange and with said third upper side surface on said third bottom flange, and a second secondary wall panel extending between central portions of said second and third main wall panels, said second secondary wall panel cooperating with said base and said second and third main wall panels to form a third compartment having an open upper end portion and disposed adjacent to a first side of said second secondary wall panel to receive a third stack of sheet material with a lower end of the third stack of sheet material in engagement with said second stack support surface area on said base and with said second upper side surface of said second bottom flange and with said fourth upper side surface of said third bottom flange, said second secondary wall panel cooperating with said base and said second and third main wall panels to form a fourth compartment having an open upper end portion and disposed adjacent to a second side of said second secondary wall panel to receive a fourth stack of sheet material with a lower end of the fourth stack of sheet material in engagement with said second stack support surface area on said base and with said second upper side surface of said second bottom flange and with said fourth upper side surface of said third bottom flange.

35. A container as set forth in claim 34 wherein said base includes a longitudinally extending strap channel having a longitudinal axis which extends parallel to and is vertically aligned with said first and second secondary wall panels, said container further including a strap which extends through said strap channel and engages said first, second and third main wall panels and said first and second secondary wall panels to retard relative movement between said base and said wall panels.

36. A container as set forth in claim 34 further including a single strap which extends around and is disposed in engagement with said first, second and third main wall panels to retard relative movement between said first, second and third main wall panels.

37. A container as set forth in claim 34 further including a plurality of wheels connected with said base and rotatable relative to said base, each of the wheels of said plurality of wheels being rotatable about an axis extending perpendicular to said first and second secondary wall panels.

38. A container as set forth in claim 34 wherein said first bottom flange and said base have first connector surface means which are disposed in interlocking engagement to retard relative movement between said first main wall panel and said base, said second bottom flange and said base having second connector surface means which are disposed in interlocking engagement to retard relative movement between said second main wall panel and said base, said third bottom flange and said base having third connector surface means which are disposed in interlocking engagement to retard relative movement between said third main wall panel and said base.

39. A container as set forth in claim 38 wherein said first secondary wall panel and a central portion of said first main wall panel have fourth connector surface means which are disposed in interlocking engagement to retard relative movement between said first main wall panel and said first secondary wall panel, said first secondary wall panel and a central portion of said third main wall panel having fifth connector surface means which are disposed in interlocking engagement to retard relative movement between said third main wall panel and said first secondary wall panel, said second secondary wall panel and a central portion of said second main wall panel having sixth connector surface means which are disposed in interlocking engagement to retard relative movement between said second main wall panel and second secondary wall panel, said second secondary wall panel and the central portion of said third main wall panel having seventh connector surface means which are disposed in interlocking engagement to retard relative movement between said third main wall panel and said second secondary wall panel.

40. A container as set forth in claim 34 wherein said first, second and third main wall panels and said first and second secondary wall panels include surface means for defining a linear strap passage which extends from an outer major side surface of said first main wall panel to an outer major side surface of said second main wall panel, said strap passage extending along upper end portions of said first and second secondary wall panels and said third main wall panel, said container further including a strap which extends through said strap passage.

41. A container for holding a plurality of stacks of sheet material, said container comprising a rectangular base, said base including a first longitudinally extending main wall support surface disposed at a first end portion of said base, a second longitudinally extending main wall support surface disposed at a second end portion of said base opposite from said first end portion of said base, said second main wall support surface having a longitudinal central axis which extends parallel to a longitudinal central axis of said first main wall support surface, a third longitudinally extending main wall support surface disposed between and spaced apart from said first and second main wall support surfaces, said third main wall support surface having a longitudinal central axis which extends parallel to longitudinal central axes of said first and second main wall support surfaces, a first plurality of upwardly opening and longitudinally extending lift element channels disposed between said first and third main wall support surfaces and having longitudinal central axes which extend parallel to longitudinal central axes of said first and third main wall support surfaces, at least some of the channels of said first plurality of lift element channels having open ends in a first edge portion of said base, said first edge portion of said base extending between the first and second end portions of said base, at least some of the channels of said first plurality of lift element channels having open ends in a second edge portion of said base which is disposed opposite to said first edge portion of said base and extends between the first and second end portions of said base, a first plurality of longitudinally extending stack support surfaces disposed between the channels of said first plurality of lift element channels to engage the bottoms of stacks of sheet material disposed in said container, said first plurality of stack support surfaces having longitudinal central axes which extend parallel to longitudinal central axes of said first plurality of lift element channels, said first plurality of stack support surfaces being disposed in a support plane which is located above said first, second and third main wall support surfaces, a second plurality of upwardly opening and longitudinally extending lift element channels disposed between said second and third main wall support surfaces and having longitudinal central axes which extend parallel to longitudinal central axes of said second and third main wall support surfaces, at least some of the channels of said second plurality of lift element channels having open ends in the first edge portion of said base, at least some of the channels of said second plurality of lift channels having open ends in the second edge portion of said base, a second plurality of longitudinally extending stack support surfaces disposed between the channels of said second plurality of lift element channels to engage the bottoms of stacks of sheet material disposed in said container, said second plurality of stack support surfaces having longitudinal central axes which extend parallel to longitudinal central axes of said second plurality of lift element channels, said second plurality of stack support surfaces being disposed in the support plane with said first plurality of stack support surfaces, a first main wall panel having a first bottom flange at a lower end portion of said first main wall panel, said first bottom flange having a lower side surface disposed in abutting engagement with said first main wall support surface on said base, said first bottom flange having a first upper side surface which is disposed in the support plane with said first plurality of stack support surfaces, said first main wall panel having a first main panel section which extends upwardly from said first bottom flange and a first pair of side flanges, said first pair of side flanges extending perpendicular to said first main panel section and extending upwardly from said first bottom flange, said first pair of side flanges extending inwardly from said first main panel section toward said first plurality of stack support surfaces, a second main wall panel having a second bottom flange at a lower end portion of said second main wall panel, said second bottom flange having a lower side surface disposed in abutting engagement with said second main wall support surface on said base, said second bottom flange having a second upper side surface which is disposed in the support plane with said second plurality of stack support surfaces, said second main wall panel having a second main panel section which extends upwardly from said second bottom flange and a second pair of side flanges, said second main panel section extending parallel to said first main panel section, said second pair of side flanges extending perpendicular to said second main panel section and extending upwardly from said second bottom flange, said second pair of side flanges extending inwardly from said second main panel section toward said second plurality of stack support surfaces, a third main wall panel having a third bottom flange at a lower end portion of said third main wall panel, said third bottom flange having a lower side surface disposed in abutting engagement with said third main wall support surface on said base, said third main wall panel having a third main panel section which is parallel to said first and second main panel sections and a third pair of side flanges, said third main panel section extending upwardly from a central portion of said third bottom flange, said third pair of side flanges extending perpendicular to and in opposite directions from said third main panel section and extending upwardly from said third bottom flange, said third pair of side flanges extending inwardly in opposite directions from said third main panel section toward said first plurality of stack support surfaces and toward said second plurality of stack support surfaces, said third bottom flange having a third upper side surface which extends from one side of said third main panel section toward said first plurality of stack support surfaces and a fourth upper side surface which extends from a side of said third main panel section opposite to said one side toward said second plurality of stack support surfaces, said third and fourth upper side surfaces on said third bottom flange being disposed in the support plane with said first and second pluralities of stack support surfaces, a first secondary wall panel extending upwardly from said base and extending between central portions of said first and third main wall panels, said first secondary wall panel cooperating with said base and said first and third main wall panels to form a first compartment disposed adjacent to a first side of said first secondary wall panel to receive a first stack of sheet material with a lower end of the first stack of sheet material in engagement with said first plurality of stack support surfaces on said base and with said first upper side surface of said first bottom flange and with said third upper side surface of said third bottom flange, said first secondary wall panel cooperating with said base and said first and third main wall panels to form a second compartment disposed adjacent to a second side of said first secondary wall panel to receive a second stack of sheet material with a lower end of the second stack of sheet material in engagement with said first plurality of stack support surfaces on said base and with said first upper side surface of said first bottom flange and with said third upper side surface of said third bottom flange, said first secondary wall panel having a lower end portion which is disposed in engagement with said first plurality of stack support surfaces on said base and with said first upper side surface on said first bottom flange and with said third upper side surface on said third bottom flange, and a second secondary wall panel extending between central portions of said second and third main wall panels, said second secondary wall panel cooperating with said base and said second and third main wall panels to form a third compartment disposed adjacent to a first side of said second secondary wall panel to receive a third stack of sheet material with a lower end of the third stack of sheet material in engagement with said second plurality of stack support surfaces on said base and with said second upper side surface of said second bottom flange and with said fourth upper side surface of said third bottom flange, said second secondary wall panel cooperating with said base and said second and third main wall panels to form a fourth compartment disposed adjacent to a second side of said second secondary wall panel to receive a fourth stack of sheet material with a lower end of the fourth stack of sheet material in engagement with said second plurality of stack support surfaces on said base and with said second upper side surface of said second bottom flange and with said fourth upper side surface of said third bottom flange, said first bottom flange and said base have first connector surface means which are disposed in interlocking engagement to retard relative movement between said first main wall panel and said base, said second bottom flange and said base having second connector surface means which are disposed in interlocking engagement to retard relative movement between said second main wall panel and said base, said third bottom flange and said base having third connector surface means which are disposed in interlocking engagement to retard relative movement between said third main wall panel and said base, said first secondary wall panel and a central portion of said first main wall panel have fourth connector surface means which are disposed in interlocking engagement to retard relative movement between said first main wall panel and said first secondary wall panel, said first secondary wall panel and a central portion of said third main wall panel having fifth connector surface means which are disposed in interlocking engagement to retard relative movement between said third main wall panel and said first secondary wall panel, said second secondary wall panel and a central portion of said second main wall panel having sixth connector surface means which are disposed in interlocking engagement to retard relative movement between said second main wall panel and said second secondary wall panel, said second secondary wall panel and the central portion of said third main wall panel having seventh connector surface means which are disposed in interlocking engagement to retard relative movement between said third main wall panel and said second secondary wall panel.

42. A container as set forth in claim 41 wherein said base includes surface means for defining a passage having a longitudinal axis which extends perpendicular to the longitudinal axes of said first and second pluralities of lift element channels, said container further including a strap which extends through said passage in said base and engages said first, second and third main wall panels and said first and second secondary wall panels to retard relative movement between said base and said wall panels.

43. A container a set forth in claim 41 further including a single strap which extends around said first, second and third main wall panels to retard relative movement between said first, second and third main wall panels.

44. A container as set forth in claim 41 further including a plurality of wheels connected with said base and rotatable relative to said base, each of the wheels of said plurality of wheels being rotatable about an axis extending parallel to the longitudinal central axes of said first and second pluralities of lift element channels.

45. A container for holding a plurality of stacks of sheet material, said container comprising a rectangular base, said base including a first longitudinally extending main wall support surface disposed at a first end portion of said base, a second longitudinally extending main wall support surface disposed at a second end portion of said base opposite from said first end portion of said base, said second main wall support surface having a longitudinal central axis which extends parallel to a longitudinal central axis of said first main wall support surface, a third longitudinally extending main wall support surface disposed between and spaced apart from said first and second main wall support surfaces, said third main wall support surface having a longitudinal central axis which extends parallel to longitudinal central axes of said first and second main wall support surfaces, a first plurality of upwardly opening and longitudinally extending lift element channels disposed between said first and third main wall support surfaces and having longitudinally central axes which extend parallel to longitudinal central axes of said first and third main wall support surfaces, at least some of the channels of said first plurality of lift element channels having open ends in a first edge portion of said base, said first edge portion of said base extending between the first and second end portions of said base, at least some of the channels of said first plurality of lift element channels having open ends in a second edge portion of said base which is disposed opposite to said first edge portion of said base and extends between the first and second end portions of said base, a first plurality of longitudinally extending stack support surfaces disposed between the channels of said first plurality of lift element channels to engage the bottoms of stacks of sheet material disposed in said container, said first plurality of stack support surfaces having longitudinal central axes which extend parallel to longitudinal central axes of said first plurality of lift element channels, said first plurality of stack support surfaces being disposed in a support plane which is located above said first, second and third main wall support surfaces, a second plurality of upwardly opening and longitudinally extending lift element channels disposed between said second and third main wall support surfaces and having longitudinal central axes which extend parallel to longitudinal central axes of said second and third main wall support surfaces, at least some of the channels of said second plurality of lift element channels having open ends in the first edge portion of said base, at least some of the channels of said second plurality of lift channels having open ends in the second edge portion of said base, a second plurality of longitudinally extending stack support surfaces disposed between the channels of said second plurality of lift element channels to engage the bottoms of stacks of sheet material disposed in said container, said second plurality of stack support surfaces having longitudinal central axes which extend parallel to longitudinal central axes of said second plurality of lift element channels, said second plurality of stack support surfaces being disposed in the support plane with said first plurality of stack support surfaces, a first main wall panel having a first bottom flange at a lower end portion of said first main wall panel, said first bottom flange having a lower side surface disposed in abutting engagement with said first main wall support surface on said base, said first bottom flange having a first upper side surface which is disposed in the support plane with said first plurality of stack support surfaces, said first main wall panel having a first main panel section which extends upwardly from said first bottom flange and a first pair of side flanges, said first pair of side flanges extending perpendicular to said first main panel section and extending upwardly from said first bottom flange, said first pair of side flanges extending inwardly from said first main panel section toward said first plurality of stack support surfaces, a second main wall panel having a second bottom flange at a lower end portion of said second main wall panel, said second bottom flange having a lower side surface disposed in abutting engagement with said second main wall support surface on said base, said second bottom flange having a second upper side surface which is disposed in the support plane with said second plurality of stack support surfaces, said second main wall panel having a second main panel section which extends upwardly from said second bottom flange and a second pair of side flanges, said second main panel section extending parallel to said first main panel section, said second pair of side flanges extending perpendicular to said second main panel section and extending upwardly from said second bottom flange, said second pair of side flanges extending inwardly from said second main panel section toward said second plurality of stack support surfaces, a third main wall panel having a third bottom flange at a lower end portion of said third main wall panel, said third bottom flange having a lower side surface disposed in abutting engagement with said third main wall support surface on said base, said third main wall panel having a third main panel section which is parallel to said first and second main panel sections and a third pair of side flanges, said third main panel section extending upwardly from a central portion of said third bottom flange, said third pair of side flanges extending perpendicular to and in opposite directions from said third main panel section and extending upwardly from said third bottom flange, said third pair of side flanges extending inwardly in opposite directions from said third main panel section toward said first plurality of stack support surfaces and toward said second plurality of stack support surfaces, said third bottom flange having a third upper side surface which extends from one side of said third main panel section toward said first plurality of stack support surfaces and a fourth upper side surface which extends from a side of said third main panel section opposite to said one side toward said second plurality of stack support surfaces, said third and fourth upper side surfaces on said third bottom flange being disposed in the support plane with said first and second pluralities of stack support surfaces, a first secondary wall panel extending upwardly from said base and extending between central portions of said first and third main wall panels, said first secondary wall panel cooperating with said base and said first and third main wall panels to form a first compartment disposed adjacent to a first side of said first secondary wall panel to receive a first stack of sheet material with a lower end of the first stack of sheet material in engagement with said first plurality of stack support surfaces on said base and with said first upper side surface of said first bottom flange and with said third upper side surface of said third bottom flange, said first secondary wall panel cooperating with said base and said first and third main wall panels to form a second compartment disposed adjacent to a second side of said first secondary wall panel to receive a second stack of sheet material with a lower end of the second stack of sheet material in engagement with said first plurality of stack support surfaces on said base and with said first upper side surface of said first bottom flange and with said third upper side surface of said third bottom flange, said first secondary wall panel having a lower end portion which is disposed in engagement with said first plurality of stack support surfaces on said base and with said first upper side surface on said first bottom flange and with said third upper side surface on said third bottom flange, and a second secondary wall panel extending between central portions of said second and third main wall panels, said second secondary wall panel cooperating with said base and said second and third main wall panels to form a third compartment disposed adjacent to a first side of said second secondary wall panel to receive a third stack of sheet material with a lower end of the third stack of sheet material in engagement with said second plurality of stack support surfaces on said base and with said second upper side surface of said second bottom flange and with said fourth upper side surface of said third bottom flange, said second secondary wall panel cooperating with said base and said second and third main wall panels to form a fourth compartment disposed adjacent to a second side of said second secondary wall panel to receive a fourth stack of sheet material with a lower end of the fourth stack of sheet material in engagement with said second plurality of stack support surfaces on said base and with said second upper side surface of said second bottom flange and with said fourth upper side surface of said third bottom flange, said first, second and third main wall panels and said first and second secondary wall panels include surface means for defining a linear strap passage which extends from an outer major side surface of said first main wall panel to an outer major side surface of said second main wall panel, said strap passage extending along upper end portions of said first and second secondary wall panels and said third main wall panel, said container further including a strap which extends through said strap passage.

46. A container for holding a plurality of stacks of sheet material, said container comprising a rectangular base having first and second end portions, a first plurality of upwardly opening and longitudinally extending lift element channels disposed in said base, at least some of the channels of said first plurality of lift element channels having open ends in a first edge portion of said base, said first edge portion of said base extending between the first and second end portions of said base, at least some of the channels of said first plurality of lift element channels having open ends in a second edge portion of said base which is disposed opposite to said first edge portion of said base and extends between the first and second end portions of said base, a first plurality of longitudinally extending stack support surfaces disposed between the channels of said first plurality of lift element channels to engage the bottoms of stacks of sheet material disposed in said container, a second plurality of upwardly opening and longitudinally extending lift element channels disposed in said base, at least some of the channels of said second plurality of lift element channels having open ends in the first edge portion of said base, at least some of the channels of said second plurality of lift channels having open ends in the second edge portion of said base, a second plurality of longitudinally extending stack support surfaces disposed between the channels of said second plurality of lift element channels to engage the bottoms of stacks of sheet material disposed in said container, a first main wall panel connected with said base at a location adjacent to the first end portion of said base, a second main wall panel connected with said base at a location adjacent to the second end portion of said base, said second main wall panel extending parallel to said first main wall panel, a third main wall panel connected with a central portion of said base and disposed midway between said first and second main wall panels, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material with a lower end of the first stack of sheet material in engagement with said first plurality of stack support surfaces on said base, said first secondary wall panel cooperating with said base and said first and third main wall panels to form a second compartment having an open upper end portion and disposed adjacent to a second side of said first secondary wall panel to receive a second stack of sheet material with a lower end of the second stack of sheet material in engagement with said first plurality of stack support surfaces on said base, and a second secondary wall panel extending between central portions of said second and third main wall panels, said secondary wall panel cooperating with said base and said second and third main wall panels to form a third compartment having an open upper end portion and disposed adjacent to a first side of said second secondary wall panel to receive a third stack of sheet material with a lower end of the third stack of sheet material in engagement with said second plurality of stack support surfaces on said base, said second secondary wall panel cooperating with said base and second and third main wall panels to form a fourth compartment having an open upper end portion and disposed adjacent to a second side of said second secondary wall panel to receive a fourth stack of sheet material with a lower end of the fourth stack of sheet material in engagement with said second plurality of stack support surfaces on said base, said first, second and third main wall panels have upper end portions with surface means for defining passages which extend through said first, second and third main wall panels in directions perpendicular to major side surfaces of said first, second and third main wall panels, said first and second secondary wall panels having upper end portions with surface means for defining passages which extend through said first and second secondary wall panels in directions parallel to major side surfaces of said first and second secondary wall panels, said container further including a strap which extends through said passages in said first, second and third main wall panels and through said passage in said first and second secondary wall panels.

47. A container as set forth in claim 46 wherein said base includes surface means which defines a passage extending along a side of said base opposite from said lift element channels, said strap extending through said passage in said base.

48. A container as set forth in claim 46 further including a first plurality of interlocking surfaces on said base and said first main wall panel for interconnecting said base and said first main wall panel, a second plurality of interlocking surfaces on said base and said second main wall panel for interconnecting said base and said second main wall panel, and a third plurality of interlocking surfaces on said base and said third main wall panel for interconnecting said base and said third main wall panel.

49. A container as set forth in claim 46 further including first surface means for defining a first side opening extending upwardly from said first edge portion of said base to the open upper end portion of said first compartment, second surface means for defining a second side opening extending upwardly from said second edge portion of said base to the open upper end portion of said second compartment, said first and second side openings being disposed on opposite sides of said container between said first and third main wall panels, third surface means for defining a third side opening extending upwardly from said first edge portion of said base to the open upper end portion of said third compartment, fourth surface means for defining a fourth side opening extending upwardly from said second edge portion of said base to the open upper end portion of said fourth compartment, said third and fourth side openings being disposed on opposite sides of said container between said second and third main wall panels.

50. A container as set forth in claim 46 wherein said first main wall panel includes a first side flange which extends perpendicular to a major side surface of said first main wall panel and extends upwardly from said first edge portion of said base to the open upper end portion of said first compartment and a second side flange which extends perpendicular to the major side surface of said first main wall panel and extends upwardly from said second edge portion of said base to the open upper end portion of said second compartment, said second main wall panel including a third side flange which extends perpendicular to a major side surface of said second main wall panel and extends upwardly from said first edge portion of said base to the open upper end portion of said third compartment and a fourth side flange which extends perpendicular to the major side surface of said second main wall panel and extends upwardly from said second edge portion of said base to the open upper end portion of said fourth compartment, said third main wall panel including a fifth side flange which is perpendicular to a major side surface of said third main wall panel and which extends in opposite directions from the major side surface of said third main wall panel and which extends upwardly from said first edge portion of said base to the open upper end portions of said first and third compartments, said third main wall panel including a sixth side flange which is perpendicular to the major side surface of said third main wall panel and which extends in opposite directions from the major side surface of said third main wall panel and which extends upwardly from said second edge portion of said base to the open upper end portions of said second and fourth compartments.

51. A container as set forth in claim 46 wherein said first side flange and said fifth side flange have surface means which at least partially defines a first side opening having a width which is less than the distance between said first and third main wall panels, said first side opening extending upwardly from said first edge portion of said base to the open upper end portion of said first compartment, said second side flange and said sixth side flange having surface means which at least partially defines a second side opening having a width which is less than the distance between said first and third main wall panels, said second side opening extending upwardly from said second edge portion of said base to the open upper end portion of said second compartment, said third side flange and said fifth side flange having surface means which at least partially defines a third side opening having a width which is less than the distance between said second and third main wall panels, said third side opening extending upwardly from said first edge portion of said base to the open upper end portion of said third compartment, said fourth side flange and said sixth side flange having surface means which at least partially defines a fourth side opening having a width which is less than the distance between said second and third main wall panels, said fourth side opening extending upwardly from said second edge portion of said base to the open upper end portion of said fourth compartment.

52. A container as set forth in claim 46 further including a first plurality of interlocking surfaces on said base and said first main wall panel for interconnecting said base and said first main wall panel, a second plurality of interlocking surfaces on said base and said second main wall panel for interconnecting said base and said second main wall panel, and a third plurality of interlocking surfaces on said base and said third main wall panel for interconnecting said base and said third main wall panel.

53. A container for holding a plurality of stacks of sheet material, said container comprising a rectangular base having first and second end portions, a first edge portion extending between the first and second end portions of said base, and a second edge portion extending between the first and second end portions of said base, a first main wall panel connected with said base at a location adjacent to the first end portion of said base, a second main wall panel connected with said base at a location adjacent to the second end portion of said base, said second main wall panel extending parallel to said first main wall panel, a third main wall panel connected with a central portion of said base and disposed midway between said first and second main wall panels, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material, said first secondary wall panel cooperating with said base and said first and third main wall panels to form a second compartment having an open upper end portion and disposed adjacent to a second side of said first secondary wall panel to receive a second stack of sheet material, a second secondary wall panel extending between central portions of said second and third main wall panels, said secondary wall panel cooperating with said base and said second and third main wall panels to form a third compartment having an open upper end portion and disposed adjacent to a first side of said second secondary wall panel to receive a third stack of sheet material, said second secondary wall panel cooperating with said base and second and third main wall panels to form a fourth compartment having an open upper end portion and disposed adjacent to a second side of said second secondary wall panel to receive a fourth stack of sheet material, first surface means for defining a first side opening extending upwardly from said first edge portion of said base to the open upper end portion of said first compartment, second surface means for defining a second side opening extending upwardly from said second edge portion of said base to the open upper end portion of said second compartment, said first and second side openings being disposed on opposite sides of said container between said first and third main wall panels, third surface means for defining a third side opening extending upwardly from said first edge portion of said base to the open upper end portion of said third compartment, and fourth surface means for defining a fourth side opening extending upwardly from said second edge portion of said base to the open upper end portion of said fourth compartment, said third and fourth side openings being disposed on opposite sides of said container between said second and third main wall panels, said first, second and third main wall panels have upper end portions with surface means for defining passages which extend through said first, second and third main wall panels in directions perpendicular to major side surfaces of said first, second and third main wall panels, said first and second secondary wall panels having upper end portions with surface means for defining passages which extend through said first and second secondary wall panels in directions parallel to major side surfaces of said first and second secondary wall panels, said container further including a strap which extends through said passages in said first, second and third main wall panels and through said passages in said first and second secondary wall panels.

54. A container as set forth in claim 53 wherein said first main wall panel includes a first side flange which extends perpendicular to a major side surface of said first main wall panel and extends upwardly from said first edge portion of said base to the open upper end portion of said first compartment and a second side flange which extends perpendicular to the major side surfaces of said first main wall panel and extends upwardly from said second edge portion of said base to the open upper end portion of said second compartment, said second main wall panel including a third side flange which extends perpendicular to a major side surface of said second main wall panel and extends upwardly from said first edge portion of said base to the open upper end portion of said third compartment and a fourth side flange which extends perpendicular to the major side surface of said second main wall panel and extends upwardly from said second edge portion of said base to the open upper end portion of said fourth compartment, said third main wall panel including a fifth side flange which is perpendicular to a major side surface of said third main wall panel and which extends in opposite directions from the major side surface of said third main wall panel and which extends upwardly from said first edge portion of said base to the open upper end portions of said first and third compartments, said third main wall panel including a sixth side flange which is perpendicular to the major side surface of said third main wall panel and which extends in opposite directions from the major side surface of said third main wall panel and which extends upwardly from said second edge portion of said base to the open upper end portions of said second and fourth compartments, said first surface means being at least partially disposed on said first and fifth side flanges, said second surface means being at least partially disposed on said second and sixth side flanges, said third surface means being at least partially disposed on said third and fifth side flanges, and said fourth surface means being at least partially disposed on said fourth and sixth side flanges.

55. A container as set forth in claim 53 wherein said base includes surface means for defining a passage which extends through said base and has a longitudinal axis which extends parallel to the major side surfaces of said first and second secondary wall panels, said strap extending through said passage in said base, said passage in said base having a downwardly facing and longitudinally extending open side portion.

56. A container a set forth in claim 53 wherein said base includes surface means which defines a passage extending along a side of said base opposite from said first, second and third main wall panels, said strap extending through said passage in said base.

57. A container as set forth in claim 56 further including a first plurality of interlocking surfaces on said base and said first main wall panel for interconnecting said base and said first main wall panel, a second plurality of interlocking surfaces on said base and said second main wall panel for interconnecting said base and said second main wall panel, and a third plurality of interlocking surfaces on said base and said third main wall panel for interconnecting said base and said third main wall panel.

58. A container for holding a plurality of stacks of sheet material, said container comprising a rectangular base having first and second end portions, a first edge portion extending between the first and second end portions of said base, and a second edge portion between the first and second end portions of said base, a first main wall panel connected with said bases at a location adjacent to the first end portion of said base, a second main wall panel connected with said base at a location adjacent to the second end portion of said base, said second main wall panel extending parallel to said first main wall panel, a third main wall panel connected with a central portion of said base and disposed midway between said first and second main wall panels, a first secondary wall panel extending upwardly from said base and extending between central portions of said first and third main wall panels, said first secondary wall panel cooperating with said base and said first and third main wall panels to form a first compartment having an open upper end portion and disposed adjacent to a first side of said first secondary wall panel to receive a first stack of sheet material, said first secondary wall panel cooperating with said base and said first and third main wall panels to form a second compartment having an open upper end portion and disposed adjacent to a second side of said first secondary wall panel to receive a second stack of sheet material, a second secondary wall panel extending between central portions of said second and third main wall panels, said secondary wall panel cooperating with said base and said second and third main wall panels to form a third compartment having an open upper end portion and disposed adjacent to a first side of said second secondary wall panel to receive a third stack of sheet material, said second secondary wall panel cooperating with said base and second and third main wall panels to form a fourth compartment having an open upper end portion and disposed adjacent to a second side of said second secondary wall panel to receive a fourth stack of sheet material, said first main wall panel includes a first side flange which extends perpendicular to a major side surface of said first main wall panel and extends upwardly from said first edge portion of said base to the open upper end portion of said first compartment and a second side flange which extends perpendicular to the major side surfaces of said first main wall panel and extends upwardly from said second edge portion of said base to the open upper end portion of said second compartment, said second main wall panel including a third side flange which extends perpendicular to a major side surface of said second main wall panel and extends upwardly from said first edge portion of said base to the open upper end portion of said third compartment and a fourth side flange which extends perpendicular to the major side surface of said second main wall panel and extends upwardly from said second edge portion of said base to the open upper end portion of said fourth compartment, said third main wall panel including a fifth side flange which is perpendicular to a major side surface of said third main wall panel and which extends in opposite directions from the major side surface of said third main wall panel and which extends upwardly from said first edge portion of said base to the open upper end portions of said first and third compartments, said third main wall panel including a sixth side flange which is perpendicular to the major side surface of said third main wall panel and which extends in opposite directions from the major side surface of said third main wall panel and which extends upwardly from said second edge portion of said base to the open upper end portions of said second and fourth compartments, said first, second and third main wall panels have upper end portions with surface means for defining passages which extend through said first, second and third main wall panels in directions perpendicular to major side surfaces of said first, second and third main wall panels, said first and second secondary wall panels having upper end portions with surface means for defining passages which extend through said first and second secondary wall panels in directions parallel to major side surfaces of said first and second secondary wall panels, said container further including a strap which extends through said passages in said first, second and third main wall panels and through said passages in said first and second secondary wall panels.

59. A container as set forth in claim 58 wherein said base includes surface means which defines a passage extending along a side of said base opposite from said first, second and third main wall panels, said strap extending through said passage in said base.

60. A container as set forth in claim 58 further including a first plurality of interlocking surfaces on said base and said first main wall panel for interconnecting said base and said first main wall panel, a second plurality of interlocking surfaces on said base and said second main wall panel for interconnecting said base and said second main wall panel, and a third plurality of interlocking surfaces on said base and said third main wall panel for interconnecting said base and said third main wall panel.

61. A container as set forth in claim 58 wherein said first side flange and said fifth side flange have surface means which at least partially defines a first side opening having a width which is less than the distance between said first and third main wall panels, said first side opening extending upwardly from said first edge portion of said base to the open upper end portion of said first compartment, said second side flange and said sixth side flange having surface means which at least partially defines a second side opening having a width which is less than the distance between said first and third main wall panels, said second side opening extending upwardly from said second edge portion of said base to the open upper end portion of said second compartment, said third side flange and said fifth side flange having surface means which at least partially defines a third side opening having a width which is less than the distance between said second and third main wall panels, said third side opening extending upwardly from said first edge portion of said base to the open upper end portion of said third compartment, said fourth side flange and said sixth side flange having surface means which at least partially defines a fourth side opening having a width which is less than the distance between said second and third main wall panels, said fourth side opening extending upwardly from said second edge portion of said base to the open upper end portion of said fourth compartment.

* * * * *

UNITED STATES PATENT AND TRADEMARK OFFICE
CERTIFICATE OF CORRECTION

PATENT NO. : 5,263,701

DATED : November 23, 1993

INVENTOR(S) : Stephen R. Kleinhen

It is certified that error appears in the above-identified patent and that said Letters Patent is hereby corrected as shown below:

Column 14, line 51, change "sing" to --single--.

Column 16, line 22, change "o" to --of--.

Column 17, line 9, change "an" to --and--.

Column 18, line 34, change "o" to --of--.

Column 19, line 53, change "wit" to --with--.

Column 37, line 48, change "passage" to --passages--.

Signed and Sealed this

Tenth Day of May, 1994

Attest:

BRUCE LEHMAN

Attesting Officer     Commissioner of Patents and Trademarks